(12) United States Patent
Zhang et al.

(10) Patent No.: US 10,657,962 B2
(45) Date of Patent: May 19, 2020

(54) MODELING MULTIPARTY CONVERSATION DYNAMICS: SPEAKER, RESPONSE, ADDRESSEE SELECTION USING A NOVEL DEEP LEARNING APPROACH

(71) Applicant: International Business Machines Corporation, Armonk, NY (US)

(72) Inventors: Rui Zhang, New Haven, CT (US); Lazaros Polymenakos, West Harrison, NY (US); Dragomir Radev, New York, NY (US); David Nahamoo, Great Neck, NY (US); Honglak Lee, Ann Arbor, MI (US)

(73) Assignees: International Business Machines Corporation, Armonk, NY (US); University of Michigan, Ann Arbor, MI (US)

( * ) Notice: Subject to any disclaimer, the term of this patent is extended or adjusted under 35 U.S.C. 154(b) by 162 days.

(21) Appl. No.: 15/968,808

(22) Filed: May 2, 2018

(65) Prior Publication Data

US 2019/0341036 A1 Nov. 7, 2019

(51) Int. Cl.
*G10L 15/22* (2006.01)
*H04L 29/06* (2006.01)
(Continued)

(52) U.S. Cl.
CPC .............. *G10L 15/22* (2013.01); *G06N 20/00* (2019.01); *G10L 15/063* (2013.01);
(Continued)

(58) Field of Classification Search
USPC ................ 704/235, 246, 247, 251, 252, 275
See application file for complete search history.

(56) References Cited

U.S. PATENT DOCUMENTS 9,575,963 B2    2/2017  Pasupalak et al.
9,645,994 B2 *  5/2017  Agarwal ............. G06F 17/2765
(Continued)

OTHER PUBLICATIONS

Maira Gatti de Bayser et al. "A Hybrid Architecture for Multi-Party Conversational Systems" May 8, 2017.
(Continued)

*Primary Examiner* — Leonard Saint Cyr
(74) *Attorney, Agent, or Firm* — Fleit Intellectual Property Law; Jose Gutman

(57) ABSTRACT

An information processing system, a computer program product, and methods for modeling multi-party dialog interactions. A method includes learning, directly from data obtained from a multi-party conversational channel, to identify particular multi-party dialog threads as well as participants in one or more conversations. Each participant utterance being converted to a continuous vector representation updated in a model of the multi-party dialog relative to each participant utterance and according to each participant's role selected from the set of: sender, addressee, or observer. The method trains the model to choose a correct addressee and a correct response for each participant utterance, using a joint selection criterion. The method learns directly from the data obtained from the multi-party conversational channel, which dialog turns belong to each particular multi-party dialog thread.

17 Claims, 15 Drawing Sheets

(51) Int. Cl.
G10L 15/18 (2013.01)
G10L 15/06 (2013.01)
G10L 17/00 (2013.01)
G06N 20/00 (2019.01)

(52) U.S. Cl.
CPC ........ *G10L 15/1822* (2013.01); *G10L 17/005* (2013.01); *H04L 65/403* (2013.01)

(56) References Cited

U.S. PATENT DOCUMENTS

| | | | |
|---|---|---|---|
| 9,785,891 B2* | 10/2017 | Agarwal | G06N 20/00 |
| 9,870,768 B2* | 1/2018 | Shi | G10L 15/16 |
| 10,181,322 B2* | 1/2019 | Hakkani-Tur | G10L 15/22 |
| 2015/0179168 A1* | 6/2015 | Hakkani-Tur | G10L 15/22 704/257 |
| 2016/0162474 A1* | 6/2016 | Agarwal | G06F 17/2765 704/9 |
| 2016/0193732 A1 | 7/2016 | Breazeal et al. | |
| 2017/0084269 A1* | 3/2017 | Shi | G10L 15/16 |

OTHER PUBLICATIONS

Ryoto Nishimura, "Chat-like Spoken Dialog System for a Multiparty Dialog Incorporating Two Agents and a User", The 1st International Conference on Human-Agent Interaction 2013.
Bordes, A., and Weston, J. 2017. Learning end-to-end goal-oriented dialog. In ICLR. 2017.
Chen, P.-C.; Chi, T.-C.; Su, S.-Y.; and Chen, Y.-N. 2017. Dynamic time-aware attention to speaker roles and contexts for spoken language understanding. In ASRU. 2017.
Chi, T.-C.; Chen, P.-C.; Su, S.-Y.; and Chen, Y.-N. 2017. Speaker role contextual modeling for language understanding and dialogue policy learning. In IJCNLP. 2017.
Cho, K.; van Merrienboer, B.; Gulcehre, C.; Bandanau, D.; Bougares, F.; Schwenk, H.; and Bengio, Y. 2014. Learning phrase representations using rnn encoder-decoder for statistical machine translation. In EMNLP. 2014.
Chung, J.; Gulcehre, C.; Cho, K.; and Bengio, Y. 2014. Empirical evaluation of gated recurrent neural networks on sequence modeling. NIPS 2014 Deep Learning and Representation Learning Workshop. 2014.
Henderson, J.; Lemon, O.; and Georgila, K. 2008. Hybrid reinforcement/supervised learning of dialogue policies from fixed data sets. Computational Linguistics 34(4):487-511. 2008.
Henderson, M.; Thomson, B.; and Williams, J. 2014. The second dialog state tracking challenge. In SIGDIAL. 2014.
Henderson, M.; Thomson, B.; and Young, S. 2014. Word-based dialog state tracking with recurrent neural networks. In SIGDIAL. 2014.
Hu, B.; Lu, Z.; Li, H.; and Chen, Q. 2014. Convolutional neural network architectures for matching natural language sentences. In NIPS. 2014.
Ji, Z.; Lu, Z.; and Li, H. 2014. An information retrieval approach to short text conversation. arXiv preprint arXiv:1408.6988. 2014.
Jovanovi'c, N.; Akker, R. o. d.; and Nijholt, A. 2006. Addressee identification in face-to-face meetings. In EACL. 2006.
Li, J.; Galley, M.; Brockett, C.; Spithourakis, G.; Gao, J.; and Dolan, B. 2016. A persona-based neural conversation model. In ACL. 2016.
Lowe, R.; Pow, N.; Serban, I.; and Pineau, J. 2015. The Ubuntu Dialogue Corpus: A large dataset for research in unstructured multi-turn dialogue systems. In SIGDIAL. 2015.
Lu, Z., and Li, H. 2013. A deep architecture for matching short texts. In NIPS. 2013.
Mei, H.; Bansal, M.; and Walter, M. R. 2017. Coherent dialogue with attention-based language models. In AAAI. 2017.
Meng, Z.; Mou, L.; and Jin, Z. 2017. Towards neural speaker modeling in multi-party conversation: The task, dataset, and models. arXiv preprint arXiv:1708.03152. 2017.
Mesnil, G.; Dauphin, Y.; Yao, K.; Bengio, Y.; Deng, L.; Hakkani-Tur, D.; He, X.; Heck, L.; Tur, G.; Yu, D.; et al. 2015. Using recurrent neural networks for slot filling in spoken language understanding. Audio, Speech, and Language Processing, IEEE/ACM Transactions on 23(3):530-539. 2015.
Pp den Akker, R., and Traum, D. 2009. A comparison of addressee detection methods for multiparty conversations. Workshop on the Semantics and Pragmatics of Dialogue. 2009.
Ouchi, H., and Tsuboi, Y. 2016. Addressee and response selection for multi-party conversation. In EMNLP. 2016.
Ritter, A.; Cherry, C.; and Dolan, W. B. 201t Data-driven response generation in social media. In EMNLP. 2011.
Serban, I. V.; Sordoni, A.; Bengio, Y.; Courville, A.; and Pineau, J. 2016. Building end-to-end dialogue systems using generative hierarchical neural network models. In AAAI. 2016.
Shang, L.; Lu, Z.; and Li, H. 2015. Neural responding machine for short-text conversation. In ACL. 2015.
Singh, S. P.; Kearns, M. J.; Litman, D. J.; and Walker, M. A. 1999. Reinforcement learning for spoken dialogue systems. In NIPS. 1999.
Vinyals, O., and Le, Q. 2015. A neural conversational model. ICML Deep Learning Workshop. 2015.
Wang, M.; Lu, Z.; Li, H.; and Liu, Q. 2015. Syntax-based deep matching of short texts. In IJCAI. 2015.
Wen, T.-H.; Gasic, M.; Mrksic, N.; Su, P.-H.; Vandyke, D.; and Young, S. 2015. Semantically conditioned lstm-based natural language generation for spoken dialogue systems. In EMNLP. 2015.
Wen, T.-H.; Vandyke, D.; Mrksic, N.; Gasic, M.; Rojas-Barahona, L. M.; Su, P.-H.; Ultes, S.; and Young, S. 2016. A network-based end-to-end trainable task-oriented dialogue system. arXiv preprint arXiv:1604.04562. 2016.
Williams, J.; Raux, A.; and Henderson, M. 2016. The dialog state tracking challenge series: A review. Dialogue & Discourse 7(3):4-33. 2016.
Yao, K.; Peng, B.; Zhang, Y.; Yu, D.; Zweig, G.; and Shi, Y. 2014. Spoken language understanding using long short-term memory neural networks. In Spoken Language Technology Workshop (SLT), 2014 IEEE, 189-194. IEEE. 2014.
Young, S.; Gasic, M.; Thomson, B.; and Williams, J. D. 2013. Pomdp-based statistical spoken dialog systems: A review. Proceedings of the IEEE 101(5):1160-1179. 2013.
Zhou, X.; Dong, D.; Wu, H.; Zhao, A.; Yu, D.; Tian, H.; Liu, X.; and Yan, R. 2016. Mult-view response selection for human-computer conversation. In EMNLP. 2016.
Zhang et al.; "Addressee and Response Selection in Multi-Party Conversations" 2018.

\* cited by examiner

| | Data | Notation |
|---|---|---|
| Input | Responding Speaker | $a_{res}$ |
| | Context | $\mathcal{C}$ |
| | Candidate Responses | $\mathcal{R}$ |
| Output | Addressee | $a \in \mathcal{A}(\mathcal{C})$ |
| | Response | $r \in \mathcal{R}$ |
| Sender ID at time $t$ | | $a_{sender}^{(t)}$ |
| Addressee ID at time $t$ | | $a_{addressee}^{(t)}$ |
| Utterance at time $t$ | | $u^{(t)}$ |
| Utterance embedding at time $t$ | | $\mathbf{u}^{(t)}$ |
| Speaker embedding of $a_i$ at time $t$ | | $\mathbf{a}_i^{(t)}$ |

Table 1: Notations for the task and model.

FIG. 1

Dialog encoders in DYNAMIC-RNN (Left) and SI-RNN (Right) for an example context at the top. Speaker embeddings are initialized as zero vectors and updated recurrently as hidden states along the time step. In SI-RNN, the same speaker embedding is updated in different units depending on the role (IGRUS for sender, IGRUA for addressee, GRUO for (observer).

Algorithm 1 Dialog Encoder in SI-RNN

1: Input
2: Dialog context $\mathcal{C}$ with speakers $\mathcal{A}(\mathcal{C})$:
3: $\mathcal{C} = [(a_{sender}^{(t)}, a_{addressee}^{(t)}, u^{(t)})]_{t=1}^{T}$
4: $\mathcal{A}(\mathcal{C}) = \{a_1, a_2, \ldots, a_{|\mathcal{A}(\mathcal{C})|}\}$
5: where $a_{sender}^{(t)}, a_{addressee}^{(t)} \in \mathcal{A}(\mathcal{C})$
6: // Initialize speaker embeddings
7: for $a_i = a_1, a_2, \ldots, a_{|\mathcal{A}(\mathcal{C})|}$ do
8: $\quad \mathbf{a}_i^{(0)} \leftarrow \mathbf{0} \in \mathbb{R}^{d_s}$
9: end for
10: //Update speaker embeddings
11: for $t = 1, 2, \ldots, T$ do
12: $\quad$ // Update sender, addressee, observers
13: $\quad a_{sdr} \leftarrow a_{sender}^{(t)}$
14: $\quad a_{adr} \leftarrow a_{addressee}^{(t)}$
15: $\quad \mathcal{O} \leftarrow \mathcal{A}(\mathcal{C}) - \{a_{sdr}, a_{adr}\}$
16: $\quad$ // Compute utterance embedding
17: $\quad \mathbf{u}^{(t)} \leftarrow \text{UtteranceEncoder}(u^{(t)})$
18: $\quad \mathbf{u}^{(t)} \leftarrow \text{Concatenate}(\mathbf{a}_{sdr}^{(t-1)}, \mathbf{u}^{(t)})$
19: $\quad$ // Update sender embedding
20: $\quad \mathbf{a}_{sdr}^{(t)} \leftarrow \text{IGRU}^S(\mathbf{a}_{sdr}^{(t-1)}, \mathbf{a}_{adr}^{(t-1)}, \mathbf{u}^{(t)})$ continued to FIG. 3B continued to FIG. 3B

FIG. 3A continued from FIG. 3A ②-------------------------------------②  continued from FIG. 3A 21:  // Update addressee embedding
22:  $\mathbf{a}_{adr}^{(t)} \leftarrow \text{IGRU}^A(\mathbf{a}_{adr}^{(t-1)}, \mathbf{a}_{sdr}^{(t-1)}, \mathbf{u}^{(t)})$
23:  // Update observer embeddings
24:  for $a_{obr}$ in $\mathcal{O}$ do
25:  $\quad \mathbf{a}_{obr}^{(t)} \leftarrow \text{GRU}^O(\mathbf{a}_{obr}^{(t-1)}, \mathbf{u}^{(t)})$
26:  end for
27: end for
28: // Return final speaker embeddings
29: Output
30: return $\mathbf{a}_i^{(T)}$ for $a_i = a_1, a_2, \ldots, a_{|\mathcal{A}(\mathcal{C})|}$

FIG. 3B

Illustration of IGRUS (upper five nodes), IGRUA (middle five nodes), and GRUO (lower four nodes). Filled circles are speaker embeddings, which are recurrently updated. Unfilled circles are gates. Filled squares are speaker embedding proposals.

|  | T | RES-CAND = 2 | | | | RES-CAND = 10 | | | |
|---|---|---|---|---|---|---|---|---|---|
|  |  | DEV | | | | DEV | | | |
|  |  | ADR-RES | ADR-RES | ADR | RES | ADR-RES | ADR-RES | ADR | RES |
| Chance | - | 0.62 | 0.62 | 1.24 | 50.00 | 0.12 | 0.12 | 1.24 | 10.00 |
| Recent+TF-IDF | 15 | 37.11 | 37.13 | 55.62 | 67.89 | 14.91 | 15.44 | 55.62 | 29.19 |
| Direct-Recent+TF-IDF | 15 | 45.83 | 45.76 | 67.72 | 67.89 | 18.94 | 19.50 | 67.72 | 29.40 |
| Static-RNN | 5 | 47.08 | 46.99 | 60.39 | 75.07 | 21.96 | 21.98 | 60.26 | 33.27 |
| (Ouchi and Tsuboi 2016) | 10 | 48.52 | 48.67 | 60.97 | 77.75 | 22.78 | 23.31 | 60.66 | 35.91 |
|  | 15 | 49.03 | 49.27 | 61.95 | 78.14 | 23.73 | 23.49 | 60.98 | 36.58 |
| Static-Hier-RNN | 5 | 49.19 | 49.38 | 62.20 | 76.70 | 23.68 | 23.75 | 62.24 | 34.51 |
| (Zhou et al. 2016) | 10 | 51.37 | 51.76 | 64.61 | 78.28 | 25.46 | 25.83 | 64.86 | 36.94 |
| (Serban et al. 2016) | 15 | 52.78 | 53.04 | 65.84 | 79.08 | 26.31 | 26.62 | 65.89 | 37.85 |
| Dynamic-RNN | 5 | 49.38 | 49.80 | 63.19 | 76.07 | 23.44 | 23.72 | 63.28 | 33.62 |
| (Ouchi and Tsuboi 2016) | 10 | 52.76 | 53.85 | 66.94 | 78.16 | 25.44 | 25.95 | 66.70 | 36.14 |
|  | 15 | 54.45 | 54.88 | 68.54 | 78.64 | 26.73 | 27.19 | 68.41 | 36.93 |
| SI-RNN (Ours) | 5 | 60.57 | 60.69 | 74.08 | 78.14 | 30.65 | 30.71 | 72.59 | 36.45 |
|  | 10 | 65.34 | 65.63 | 78.76 | 80.34 | 34.18 | 34.09 | 77.13 | 39.20 |
|  | 15 | 67.01 | 67.30 | 80.47 | 80.91 | 35.50 | 35.76 | 78.53 | 40.83 |
| SI-RNN w/ shared IGRUs | 15 | 59.50 | 59.47 | 74.20 | 78.08 | 28.31 | 28.45 | 73.35 | 36.00 |
| SI-RNN w/o joint selection | 15 | 63.13 | 63.40 | 77.56 | 80.38 | 32.24 | 32.53 | 77.61 | 39.73 |

Table 2: Addressee and response selection results on the Ubuntu Multiparty Conversation Corpus. Metrics include accuracy of addressee selection (ADR), response selection (RES), and pair selection (ADR-RES). RES-CAND: the number of candidate responses. T: the context length.

FIG. 5

|                   | Total  | Train  | Dev    | Test   |
|-------------------|--------|--------|--------|--------|
| # Docs            | 7,355  | 6,606  | 367    | 382    |
| # Utters          | 2.4M   | 2.1M   | 132.4k | 151.3k |
| # Samples         | -      | 665.6k | 45.1k  | 51.9k  |
| Adr Mention Freq  | -      | 0.32   | 0.34   | 0.34   |
| # Speakers / Doc  | 26.8   | 26.3   | 30.7   | 32.1   |
| # Utters / Doc    | 326.3  | 317.9  | 360.8  | 396.1  |
| # Words / Utter   | 11.1   | 11.1   | 11.2   | 11.3   |

Table 3: Data Statistics. "Adr Mention Freq" is the frequency of explicit addressee mention.

FIG. 6

| | Sender | Addressee | Utterance |
|---|---|---|---|
| 1 | codepython | wafflejock | thanks |
| 1 | wafflejock | codepython | yup np |
| 2 | wafflejock | theoletom | you can use sudo apt-get install packagename – reinstall, to have apt-get install reinstall some package/metapackage and redo the configuration for the program as well |
| 3 | codepython | - | i installed ubuntu on a separate external drive. now when i boot into mac, the external drive does not show up as bootable. the blue light is on. any ideas? |
| 4 | Guest54977 | - | hello there. wondering to anyone who knows, where an ubuntu backup can be retrieved from. |
| 2 | theoletom | wafflejock | it's not a program. it's a desktop environment. |
| 4 | Guest54977 | - | did some searching on my system and googling, but couldn't find an answer |
| 2 | theoletom | - | be a trace of it left yet there still is. |
| 2 | theoletom | - | i think i might just need a fresh install of ubuntu. if there isn't a way to revert to default settings |
| 5 | releaf | - | what's your opinion on a $500 laptop that will be a dedicated ubuntu machine? |
| 5 | releaf | - | are any of the pre-loaded ones good deals? |
| 5 | releaf | - | if not, are there any laptops that are known for being oem-heavy or otherwise ubuntu friendly? |
| 3 | codepython | - | my usb stick shows up as bootable (efi) when i boot my mac. but not my external hard drive on which i just installed ubuntu. how do i make it bootable from mac hardware? |
| 3 | Jordan U | codepython | did you install ubuntu to this external drive from a different machine? |
| 5 | Umeaboy | releaf | what country you from? |
| 5 | wafflejock | | |

| Model Prediction | Addressee | Response |
|---|---|---|
| Direct-Recent+TF-IDF | theoletom | ubuntu install fresh |
| Dynamic-RNN | codepython | no prime is the replacement |
| SI-RNN | * releaf | * there are a few ubuntu dedicated laptop providers like umeaboy is asking depends on where you are |

(a) SI-RNN chooses to engage in a new sub-conversation by suggesting a solution to "releaf" about Ubuntu dedicated laptops.

Table 4: Case Study. * denotes the ground-truth. Sub-conversations are coded with different numbers for the purpose of analysis (sub-conversation labels are not available during training or testing).

FIG. 8

| | Sender | Addressee | Utterance |
|---|---|---|---|
| 1 | VeryBewitching | nicomachus | anything i should be concerned about before i do it? |
| 1 | nicomachus | VeryBewitching | always back up before partitioning. |
| 1 | VeryBewitching | nicomachus | i would have assumed that, i was wondering more if this is something that tends to be touch and go, want to know if i should put coffee on : ) |
| 2 | TechMonger | - | it was hybernating. i can ping it now |
| 2 | TechMonger | - | why does my router pick up disconnected devices when i reset my device list? or how |
| 2 | Ionic | - | because the dhcp refresh interval hasn't passed yet? |
| 2 | TechMonger | - | so dhcp refresh is different than device list refresh? |
| 2 | D33p | TechMonger | what an enlightenment @techmonger : ) |
| 2 | BuzzardBuzz | - | dhcp refresh for all clients is needed when you change your subnet ip |
| 2 | BuzzardBuzz | - | if you want them to work together |
| 2 | Ionic | BuzzardBuzz | uhm, no. |
| 2 | chingao | TechMonger | nicomachus asked this way at the beginning: is the machine that you 're trying to ping turned on? |
| 1 | nicomachus | | |

| Model Prediction | Addressee | Response |
|---|---|---|
| Direct-Recent+TF-IDF | * VeryBewitching | i have tried with this program y-ppa manager, yet still doesn't work. |
| Dynamic-RNN | chingao | install the package "linux-generic", that will install the kernel and the headers if they are |
| | * VeryBewitching | not installed |
| SI-RNN | | * if it's the last partition on the disk, it won't take long. if gparted has to copy data to move another partition too, it can take a couple hours. |

(b) SI-RNN remembers the distant sub-conversation 1 and responds to "VeryBewitching" with a detailed answer.

Table 4: Case Study. * denotes the ground-truth. Sub-conversations are coded with different numbers for the purpose of analysis (sub-conversation labels are not available during training or testing).

MODELING MULTIPARTY CONVERSATION DYNAMICS: SPEAKER, RESPONSE, ADDRESSEE SELECTION USING A NOVEL DEEP LEARNING APPROACH

STATEMENT REGARDING JOINT RESEARCH AGREEMENT

The subject matter disclosed in this patent application was developed and the claimed invention was made by, or on behalf of, one or more parties to a joint research agreement (Agreement #4915012629) that was in effect on or before the filing date of this patent application. The claimed invention was made as a result of activities undertaken within the scope of the joint research agreement. The parties to the joint research agreement are: 1) International Business Machines Corporation; and 2) the University of Michigan.

STATEMENT REGARDING PRIOR DISCLOSURE BY THE INVENTORS

The inventors of this patent application invented the potential prior art subject matter that was publicly disclosed in an inventor-originated printed publication technical paper (Technical Paper) identified below. A copy of this Technical Paper is filed with this patent application. This Technical Paper is an inventor-originated public disclosure made one year or less before the effective filing date of this patent application. Accordingly, this Technical Paper is not prior art to the claimed invention in this patent application because it is an exception under 35 U.S.C. 102(b)(1)(A).

Title of Technical Paper: Addressee and Response Selection in Multi-Party Conversations with Speaker Interaction RNNs Authors of Technical Paper: Rui Zhang, Honglak Lee, Lazaros Polymenakos, and Dragomir Radev.

Technical Paper Published By: Association for the Advancement of Artificial Intelligence (www.aaai.org).

Technical Paper Publication Date: 2018

BACKGROUND

The present invention generally relates to learning systems used in modeling multi-party conversations, and more particularly relates to a deep learning method to select a response and an addressee of the response to respond to a speaker utterance in a multi-party conversation.

Understanding multi-party conversations is challenging because of complex speaker interactions: multiple speakers exchange messages with each other, playing different roles (sender, addressee, observer), and these roles vary across turns. Real-world conversations often involve more than two speakers.

In an UBUNTU Internet Relay Chat channel (IRC), for example, one user can initiate a discussion about an Ubuntu-related technical issue, and many other users can work together to solve the problem. Dialogs can have complex speaker interactions: at each turn, users can play one of three roles (sender, addressee, observer), and those roles vary across turns. To detect an addressee of an utterance and to predict a response utterance in multi-party conversations has been a very difficult technical problem to solve. For example, consider a case where a responding speaker is talking to two other speakers in separate conversation (also referred to as dialog) threads. The choice of addressee is likely to be either of the two other speakers. In the past, inconsistent selection of addressee-response pairs has often caused confusion and inaccuracy in tracking multi-party conversations.

BRIEF SUMMARY

According to various embodiments, disclosed is a method for modeling multi-party dialog interactions using deep learning to build automated agents for social and enterprise networking channels, the method comprising: learning, directly from data obtained from a multi-party conversational channel, to identify particular multi-party dialog threads as well as speakers in one or more conversations, by: during training, from a multi-party dialog, converting each participant utterance to a continuous vector representation and updating a model of the multi-party dialog relative to each participant utterance in the multi-party dialog according to each participant's utterance role selected from the set of: sender, addressee, or observer; training the model to choose a correct addressee and a correct response for each participant utterance, using a joint selection criterion; during testing, parsing data obtained from the multi-party conversational channel to identify and classify individual participant utterances regarding whether each participant utterance belongs in a particular multi-party dialog thread, by choosing for each identified participant utterance a finite list of correct next identified participant utterance and an addressee of the correct next identified participant utterance in the particular multi-party dialog thread; and learning, directly from the data obtained from the multi-party conversational channel, which dialog turns belong to each particular multi-party dialog thread, by: during training, from the continuous vector representation, updating the model of the multi-party dialog on a specific dialog topic and training the model to select whether each participant utterance belongs in the dialog topic or not; and during testing, parsing data obtained from the multi-party conversational channel to classify each participant utterance by converting the participant utterance to a continuous vector representation regarding whether each participant utterance belongs to a dialog topic or not.

According to various embodiments, disclosed are a processing system and a computer program product for performing operations according to the above method.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 1 is Table 1 showing a summary of several common notations used throughout this disclosure;

FIGS. 3A and 3B constitute an example program listing illustrating an example algorithm for the dialog encoder of FIG. 2, according to an embodiment of the present invention;

FIG. 5 is Table 2 showing example addressee and response selection results on the Ubuntu Multiparty Conversation Corpus, and including example results for accuracy of addressee selection (ADR), response selection (RES), and pair selection (ADR-RES);

FIG. 6 is Table 3 showing a summary of data statistics from the Ubuntu Multi-party Conversation Corpus according to one example data set;

FIGS. 8 and 9 constitute parts (a) and (b) of Table 4 illustrating examples of speakers in complex multi-party conversations;

DETAILED DESCRIPTION

Figure 2A:
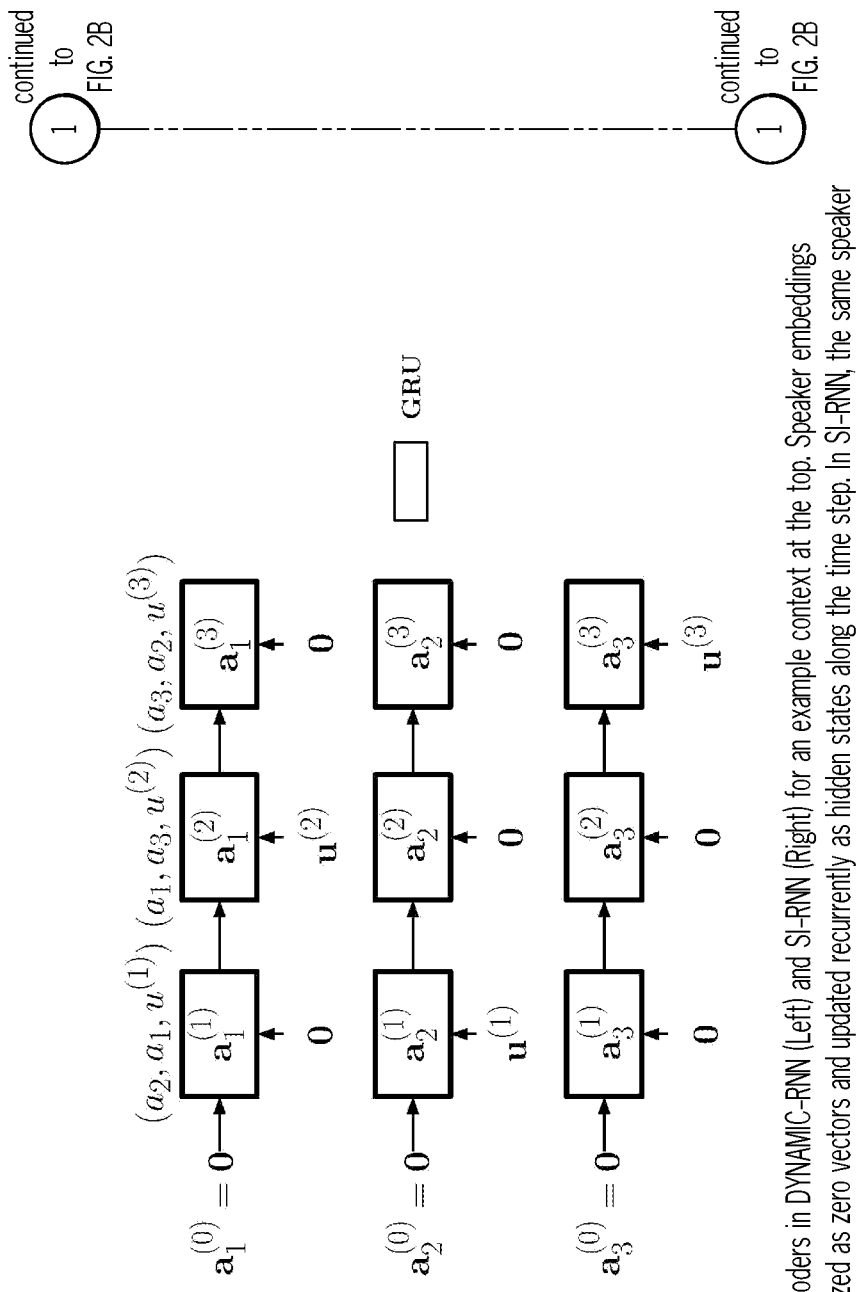
FIGS. 2A and 2B constitute a block diagram illustrating an example of a dialog encoder on an example context, according to an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Various embodiments of the present invention are applicable to synchronizing data values between two or more data stores in a wide variety of environments, which may include cloud computing environments and non-cloud environments.

1 Introduction

Real-world conversations often involve more than two speakers. In the Ubuntu Internet Relay Chat channel (IRC), for example, one user can initiate a discussion about an Ubuntu-related technical issue, and many other users can work together to solve the problem. Dialogs can have complex speaker interactions: at each turn, users play one of three roles (sender, addressee, observer), and those roles vary across turns.

In this disclosure, we study the problem of addressee and response selection in multi-party conversations: given a responding speaker and a dialog context, the task is to select an addressee and a response from a set of candidates for the responding speaker. The task involves modeling multi-party conversations and can be directly used to build retrieval-based dialog systems, such as discussed in the following printed publication references: Lu and Li, 2013; Hu et al., 2014; Ji et al., 2014; Wang et al., 2015, the collective teachings thereof being hereby incorporated herein by reference in their entirety. It should be noted that copies of all of the cited printed publication references cited in the present disclosure are submitted in the record of this patent application.

The previous state-of-the-art DYNAMIC-RNN model, such as discussed in the following printed publication reference: Ouchi and Tsuboi (2016), the collective teachings thereof being hereby incorporated herein by reference in their entirety, maintains speaker embeddings to track each speaker status, which dynamically changes across time steps. It then produces the context embedding from the speaker embeddings and selects the addressee and response based on embedding similarity. However, this model updates only the sender embedding, not the embeddings of the addressee or observers, with the corresponding utterance, and it selects the addressee and response separately. In this way, it only models who says what and fails to capture addressee information. Experimental results show that the separate selection process often produces inconsistent addressee-response pairs.

To solve these issues, the present disclosure introduces a Speaker Interaction Recurrent Neural Network (SI-RNN). SI-RNN redesigns the dialog encoder by updating speaker embeddings in a role-sensitive way. Speaker embeddings are updated in different GRU-based units depending on their roles (sender, addressee, observer). Furthermore, the addressee and response are mutually dependent and the present disclosure views the task as a joint prediction problem. Therefore, SI-RNN models the conditional probability (of addressee given the response and vice versa) and selects the addressee and response pair by maximizing the joint probability.

On a public standard benchmark data set, SI-RNN significantly improves the addressee and response selection accuracy, particularly in complex conversations with many speakers and responses to distant messages with many turns in the past.

2 Related Work

The present disclosure follows a data-driven approach to dialog systems. Previous systems, such as discussed in the following printed publication references: Singh et al. (1999), Henderson et al. (2008), and Young et al. (2013), the collective teachings thereof being hereby incorporated herein by reference in their entirety, optimize the dialog policy using Reinforcement Learning or the Partially Observable Markov Decision Process framework. In addition, the printed publication reference: Henderson et al. (2014a), the teachings thereof being hereby incorporated herein by reference in their entirety, proposes to use a predefined ontology as a logical representation for the information exchanged in the conversation. The dialog system can be divided into different modules such as Natural Language Understanding, such as discussed in the following printed publication references: Yao et al., 2014; and Mesnil et al., 2015, the collective teachings thereof being hereby incorporated herein by reference in their entirety, Dialog State Tracking, such as discussed in the following printed publication references: Henderson et al., 2014b; and Williams et al., 2016, the collective teachings thereof being hereby incorporated herein by reference in their entirety, and Natural Language Generation, such as discussed in the printed publication reference: Wen et al., 2015, the teachings thereof being hereby incorporated herein by reference in their entirety. Furthermore, end-to-end trainable goal-oriented dialog systems were proposed by the following printed publication references: Wen et al. (2016) and Bordes and Weston (2017, the collective teachings thereof being hereby incorporated herein by reference in their entirety.

Recently, short text conversation has been popular. The system receives a short dialog context and generates a response using statistical machine translation or seq-to-seq networks, such as discussed in the following printed publication references: Ritter et al., 2011; Vinyals and Le, 2015; Shang et al., 2015; Serban et al., 2016; Li et al., 2016; Mei et al., 2017, the collective teachings thereof being hereby incorporated herein by reference in their entirety. In contrast to response generation, the retrieval-based approach uses a ranking model to select the highest scoring response from candidates, such as discussed in the following printed publication references: Lu and Li, 2013; Hu et al., 2014; Ji et al., 2014; Wang et al., 2015, the collective teachings thereof being hereby incorporated herein by reference in their entirety. However, these models are single-turn responding machines and thus still limited to short contexts with only two speakers.

As for larger context, the following printed publication reference: Lowe et al. (2015), the collective teachings thereof being hereby incorporated herein by reference in their entirety, proposed the Next Utterance Classification (NUC) task for multi-turn two-party dialogs. The following printed publication reference: Ouchi and Tsuboi (2016), the collective teachings thereof being hereby incorporated herein by reference in their entirety, extended NUC to multi-party conversations by integrating the addressee detection problem. Since the data is text based, they use only textual information to predict addressees as opposed to relying on acoustic signals or gaze information in multi-modal dialog systems, such as discussed in the following printed publication references: Jovanovic, Akker, and Nijholt 2006; op den Akker and Traum, 2009, the collective teachings thereof being hereby incorporated herein by reference in their entirety.

Furthermore, there has been recent focus on modeling role-specific information given the dialog contexts, such as discussed in the following printed publication references Meng, Mou, and Jin 2017; Chi et al. 2017; Chen et al. 2017, the collective teachings thereof being hereby incorporated herein by reference in their entirety. For example, Meng, Mou, and Jin 2017, combine content and temporal information to predict the utterance speaker. By contrast, the presently disclosed SIRNN explicitly utilizes the speaker interaction to maintain speaker embeddings and predicts the addressee and response by joint selection.

3 Preliminaries 3.1 Addressee and Response Selection

Given a responding speaker $a_{res}$, and a dialog context $\mathcal{C}$, the task is to select a response and an addressee. $\mathcal{C}$ is a list ordered by time step:

$$\mathcal{C} = [(a_{sender}^{(t)}, a_{addressee}^{(t)}, u^{(t)})]_{t=1}^{T}$$

where $a_{sender}^{(t)}$ says $u^{(t)}$ to $a_{addressee}^{(t)}$ at time step t, and T is the total number of time steps before the response and addressee selection. The set of speakers appearing in $\mathcal{C}$ is denoted $\mathcal{A}(\mathcal{C})$. As for the output, the addressee is selected from $\mathcal{A}(\mathcal{C})$, and the response is selected from a set of candidates $\mathcal{R}$. Here, $\mathcal{R}$ contains the ground-truth response and one or more false responses. Some examples are provided in Table 7 (Section 6).

t, and T is the total number of time steps before the response and addressee selection. The set of speakers appearing in C is denoted A(C). As for the output, the addressee is selected from A(C), and the response is selected from a set of candidates R. R contains the ground-truth response and one or more false responses. We provide some examples in Table 4 (FIGS. 8 and 9).

3.2 DYNAMIC-RNN Model

In this section, we briefly review the state-of-the-art DYNAMIC-RNN model, such as discussed in the printed publication reference: Ouchi and Tsuboi, 2016, the teachings thereof being hereby incorporated herein by reference in their entirety, which our proposed model in part is based on. DYNAMIC-RNN solves the task in two phases: 1) the dialog encoder maintains a set of speaker embeddings to track each speaker status, which dynamically changes with time step t; 2) then DYNAMIC-RNN produces the context embedding from the speaker embeddings and selects the addressee and response based on embedding similarity among context, speaker, and utterance.

Dialog Encoder. FIG. 2A illustrates the dialog encoder in DYNAMIC-RNN on an example context. In this example, $a_2$ says $u^{(1)}$ to $a_1$, then $a_1$ says $u^{(2)}$ to $a_3$, and finally $a_3$ says $u^{(3)}$ to $a_2$. The context $\mathcal{C}$ will be:

$$\mathcal{C} = [(a_2, a_1, u^{(1)}), (a_1, a_3, u^{(2)}), (a_3, a_2, u^{(3)})] \quad (1)$$

with the set of speakers $\mathcal{A}(\mathcal{C}) = \{a_1, a_2, a_3\}$.

For a speaker $a_i$, the bold letter $\mathbf{a}_i^{(t)} \in \mathbb{R}^{d_s}$ denotes its embedding at time step t. Speaker embeddings are initialized as zero vectors and updated recurrently as hidden states of GRUs, such as discussed in the following printed publication references: Cho et al., 2014; Chung et al., 2014, the collective teachings thereof being hereby incorporated herein by reference in their entirety. Specifically, for each time step t with the sender $a_{sdr}$ and the utterance $u^{(t)}$, the sender embedding $\mathbf{a}_{sdr}$ is updated recurrently from the utterance:

$$\mathbf{a}_{sdr}^{(t)} = GRU(\mathbf{a}_{sdr}^{(t-1)}, \mathbf{u}^{(t)}),$$

where $\mathbf{u}^{(t)} \in \mathbb{R}^{d_u}$ is the embedding for utterance $u^{(t)}$. Other speaker embeddings are updated from $\mathbf{u}^{(t)} = 0$. The speaker embeddings are updated until time step T.

Selection Model. To summarize the whole dialog context $\mathcal{C}$, the model applies element-wise max pooling over all the speaker embeddings to get the context embedding $\mathbf{h}_{\mathcal{C}}$:

$$h_C = \max_{a_i = a_1, \ldots, a_{|A(C)|}} \mathbf{a}_i^{(T)} \in \mathbb{R}^{d_s} \quad (2)$$

The probability of an addressee and a response being the ground truth is calculated based on embedding similarity. To be specific, for addressee selection, the model compares the candidate speaker $a_p$, the dialog context $\mathcal{C}$, and the responding speaker $a_{res}$:

$$\mathbb{P}(a_p | \mathcal{C}) = \sigma([\mathbf{a}_{res}; \mathbf{h}_{\mathcal{C}}]^T W_a \mathbf{a}_p) \quad (3)$$

where $\mathbf{a}_{res}$ is the final speaker embedding for the responding speaker $a_{res}$, $\mathbf{a}_p$ is the final speaker embedding for the candidate addressee $a_p$, σ is the logistic sigmoid function, [;] is the row-wise concatenation operator, and $W_a \in \mathbb{R}^{2d_s \times d_s}$ is a learnable parameter. Similarly, for response selection, $$\mathbb{P}_{(r_q | \mathcal{C})} = \sigma([a_{res}; \mathbf{h}_\mathcal{C}]^T W_r r_q) \qquad (4)$$

where $r_q \in \mathbb{R}^{d_u}$ is the embedding for the candidate response $r_q$, and $W_r \in \mathbb{R}^{2d_s \times d_u}$ is a learnable parameter.

The model is trained end-to-end to minimize a joint cross-entropy loss for the addressee selection and the response selection with equal weights. At test time, the addressee and the response are separately selected to maximize the probability in Eq 3 and Eq 4.

4 Speaker Interaction RNN

While DYNAMIC-RNN can track the speaker status by capturing who says what in multi-party conversation, there are still some issues. First, at each time step, only the sender embedding is updated from the utterance. Therefore, other speakers are blind to what is being said, and the model fails to capture addressee information. Second, while the addressee and response are mutually dependent, DYNAMIC-RNN selects them independently. Consider a case where the responding speaker is talking to two other speakers in separate conversation (also referred to as dialog) threads. The choice of addressee is likely to be either of the two speakers, but the choice is much less ambiguous if the correct response is given, and vice versa. DYNAMIC-RNN often produces inconsistent addressee-response pairs due to the separate selection. See Table 4 (FIGS. 8 and 9) for examples.

In contrast to DYNAMIC-RNN, the dialog encoder in SI-RNN updates embeddings for all the speakers besides the sender at each time step. Speaker embeddings are updated depending on their roles: the update of sender is different from the addressee, which is different from the observers. Furthermore, the update of a speaker embedding is not only from the utterance, but also from other speakers. These are achieved by designing variations of GRUs for different roles. Finally, SI-RNN selects the addressee and response jointly by maximizing the joint probability.

4.1 Utterance Encoder

To encode an utterance $u = (w_1, w_2, \ldots, w_N)$ of N words, we use a RNN with Gated Recurrent Units, such as discussed in the following printed publication references: Cho et al., 2014; Chung et al., 2014, the collective teachings thereof being hereby incorporated herein by reference in their entirety, as follows:

$$h_j = GRU(h_{j-1}, x_j)$$

where $x_j$ is the word embedding for $w_j$, and $h_j$ is the GRU hidden state. $h_0$ is initialized as a zero vector, and the utterance embedding is the last hidden state, i.e. $u = h_N$.

4.2 Dialog Encoder

Figure 2B:
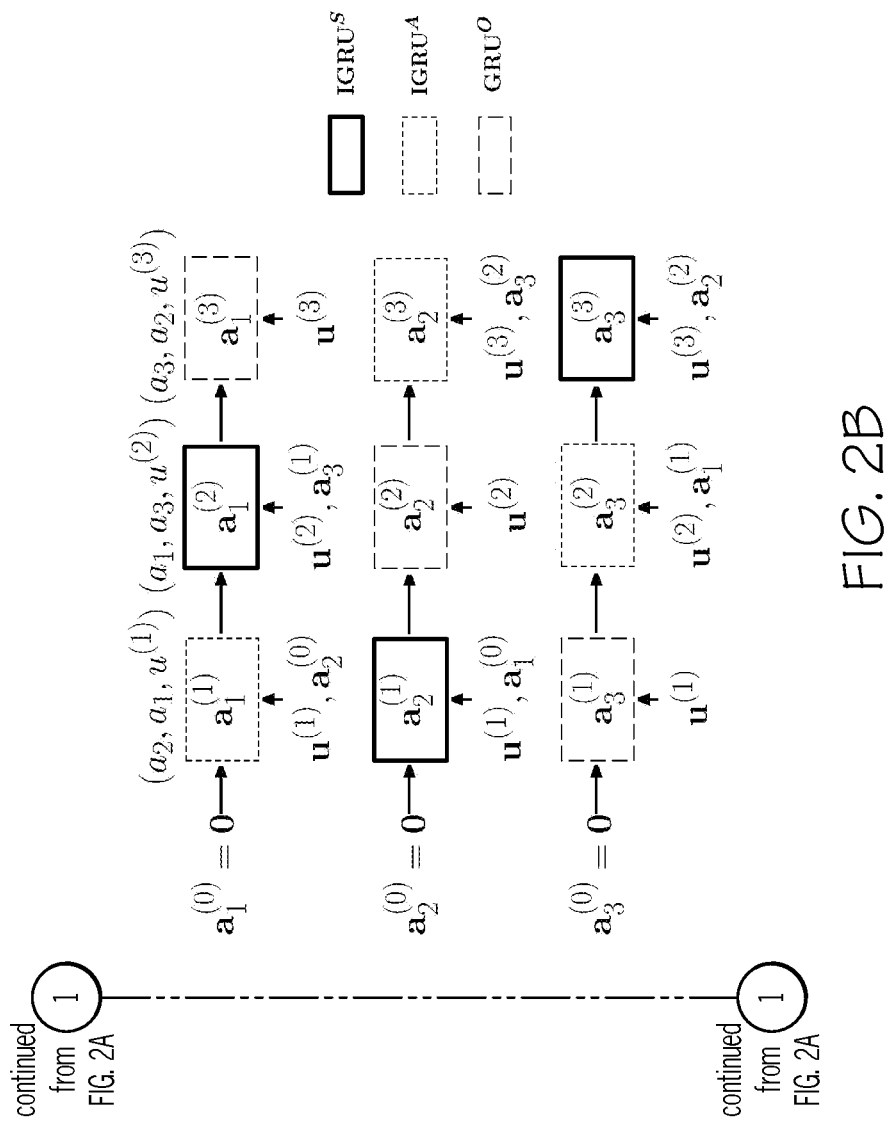

FIG. 2B shows how SI-RNN encodes the example in Eq 1. Unlike DYNAMIC-RNN, SI-RNN updates all speaker embeddings in a role-sensitive manner. For example, at the first time step when $a_2$ says $u^{(1)}$ to $a_1$, Dynamic-RNN only updates $a_2$ using $u^{(1)}$, while other speakers are updated using 0. In contrast, SI-RNN updates each speaker status with different units: $IGRU^S$ updates the sender embedding $a_2$ from the utterance embedding $u^{(1)}$ and the addressee embedding $a_1$; $IGRU^A$ updates the addressee embedding $a_1$ from $u^{(1)}$ and $a_2$; $GRU^O$ updates the observer embedding $a_3$ from $u^{(1)}$.

Algorithm 1 (FIGS. 3A and 3B) gives a formal definition of the dialog encoder in SI-RNN. The dialog encoder is a function that takes as input a dialog context $\mathcal{C}$ (lines 1-5) and returns speaker embeddings at the final time step (lines 28-30). Speaker embeddings are initialized as $d_s$-dimensional zero vectors (lines 6-9). Speaker embeddings are updated by iterating over each line in the context (lines 10-27).

4.3 Role-sensitive Update

In this subsection, we explain in detail how $IGRU^S / IGRU^A / GRU^O$ update speaker embeddings according to their roles at each time step (Algorithm 4 lines 19-26).

Figure 4:
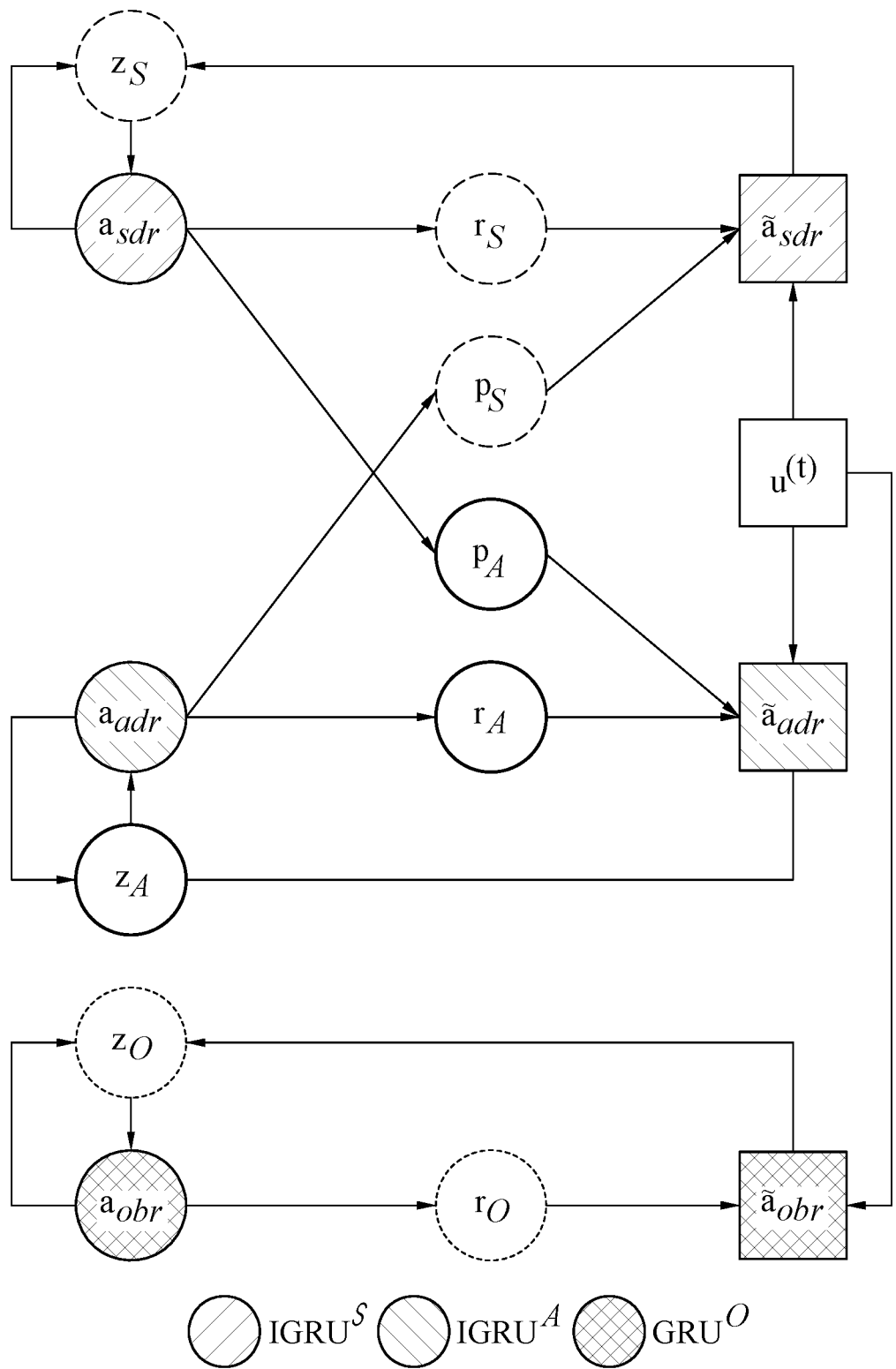
FIG. 4 is a block diagram illustrating an example of several gated recurrent units (GRU's) used with the dialog encoder of FIG. 2 and the algorithm of FIG. 3, according to an embodiment of the present invention.

As shown in FIG. 4, $IGRU^S / IGRU^A / GRU^O$ are all GRU-based units. $IGRU^S$ updates the sender embedding from the previous sender embedding $a_{sdr}^{(t-1)}$ the previous addressee embedding $a_{adr}^{(t-1)}$ and the utterance embedding $u^{(t)}$:

$$a_{sdr}^{(t)} \leftarrow IGRU^S(a_{sdr}^{(t-1)}, a_{adr}^{(t-1)}, u^{(t)})$$

The update, as illustrated in the upper part of FIG. 4, is controlled by three gates. The $r_S^{(t)}$ gate controls the previous sender embedding $a_{sdr}^{(t-1)}$, and $p_S^{(t)}$ controls the previous addressee embedding $a_{adr}^{(t-1)}$. Those two gated interactions together produce the sender embedding proposal $\tilde{a}_{sdr}^{(t)}$. Finally, the update gate $z_S^{(t)}$ combines the proposal $\tilde{a}_{sdr}^{(t)}$ and the previous sender embedding $a_{sdr}^{(t-1)}$ to update the sender embedding $a_{sdr}^{(t)}$. The computations in $IGRU^S$ (including gates $r_S^{(t)}$, $p_S^{(t)}$, $z_S^{(t)}$, the proposal embedding $\tilde{a}_{sdr}^{(t)}$, and the final updated embedding $a_{sdr}^{(t)}$) are formulated as:

$$r_S^{(t)} = \sigma(W_S^r u^{(t)} + U_S^r a_{sdr}^{(t-1)} + V_S^r a_{adr}^{(t-1)})$$

$$p_S^{(t)} = \sigma(W_S^p u^{(t)} + U_S^p a_{sdr}^{(t-1)} + V_S^p a_{adr}^{(t-1)})$$

$$z_S^{(t)} = \sigma(W_S^z u^{(t)} + U_S^z a_{sdr}^{(t-1)} + V_S^z a_{adr}^{(t-1)})$$

$$\tilde{a}_{sdr}^{(t)} = \tanh(W_S u^{(t)} + U_S(r_S^{(t)} e a_{sdr}^{(t-1)}) + V_S(p_S^{(t)} e a_{adr}^{(t-1)}))$$

$$a_{sdr}^{(t)} = z_S^{(t)} e a_{sdr}^{(t-1)} + (1 - z_S^{(t)}) e \tilde{a}_{sdr}^{(t)}$$

where $\{W_S^r, W_S^p, W_S^z, U_S^r, U_S^p, U_S^z, V_S^r, V_S^p, V_S^z, W_S, U_S, V_S\}$ are learnable parameters. $IGRU^A$ uses the same formulation with a different set of parameters, as illustrated in the middle of FIG. 1. In addition, we update the observer embeddings from the utterance. $GRU^O$ is implemented as the traditional GRU unit in the lower part of FIG. 1. Note that the parameters in $IGRU^S / IGRU^A / GRU^O$ are not shared. This allows SI-RNN to learn role-dependent features to control speaker embedding updates. The formulations of $IGRU^A$ and $GRU^O$ are similar.

4.4 Joint Selection

The dialog encoder takes the dialog context $\mathcal{C}$ as input and returns speaker embeddings at the final time step, $a_i^{(T)}$. Recall from Section 3.2 that Dynamic-RNN produces the context embedding $\mathbf{h}_\mathcal{C}$ using Eq 2 and then selects the addressee and response separately using Eq 3 and Eq 4.

In contrast, SI-RNN performs addressee and response selection jointly: the response is dependent on the addressee and vice versa. Therefore, we view the task as a sequence prediction process: given the context and responding speaker, we first predict the addressee, and then predict the response given the addressee. (We also use the reversed prediction order as in Eq 7.)

In addition to Eq 3 and Eq 4, SI-RNN is also trained to model the conditional probability as follows. To predict the addressee, we calculate the probability of the candidate speaker $a_p$, to be the ground-truth given the ground-truth response r (available during training time):

$$\mathbb{P}_{(a_p | \mathcal{C}, r)} = \sigma([a_{res}; \mathbf{h}_\mathcal{C}; r]^T W_a a_p) \qquad (5)$$

The key difference from Eq 3 is that Eq 5 is conditioned on the correct response r with embedding r. Similarly, for response selection, we calculate the probability of a candidate response $r_q$ given the ground-truth addressee $a_{adr}$:

$$\mathbb{P}(r_q | \mathcal{C}, a_{adr}) = \sigma([a_{res}; \mathbf{h}_\mathcal{C}; a_{adr}]^T W_{ra} r_q) \quad (6)$$

At test time, SI-RNN selects the addressee-response pair from $\mathcal{A}(\mathcal{C}) \times \mathcal{R}$ to maximize the joint probability $\mathbb{P}(r_q, a_p, | \mathcal{C})$:

$$\hat{a}, \hat{r} = \arg\max_{a_p, r_q \in \mathcal{A}(\mathcal{C}) \times \mathcal{R}} \mathbb{P}(r_q, a_p | C) \quad (7)$$
$$= \arg\max_{a_p, r_q \in \mathcal{A}(\mathcal{C}) \times \mathcal{R}} \mathbb{P}(r_q | C) \cdot \mathbb{P}(a_p | C, r_q) +$$
$$\mathbb{P}(a_p | C) \cdot \mathbb{P}(r_q | C, a_p)$$

In Eq 7, we decompose the joint probability into two terms: the first term selects the response given the context, and then selects the addressee given the context and the selected response; the second term selects them in the reversed order.

It should be noted that we also considered an alternative decomposition of the joint probability as log $\mathbb{P}(r_q, a_p | \mathcal{C}) = \frac{1}{2}[\log \mathbb{P}(r_q | \mathcal{C}) + \log \mathbb{P}(a_p | \mathcal{C}, r_q) + \log \mathbb{P}(a_p | \mathcal{C}) + \log \mathbb{P}(r_q | \mathcal{C}, a_p)]$, but the performance was similar to Eq 7.

5 Experimental Setup

Data Set. We use the Ubuntu Multiparty Conversation Corpus, such as discussed in the following printed publication reference: Ouchi and Tsuboi (2016), the teachings thereof being hereby incorporated herein by reference in their entirety, and summarize the data statistics in Table 3 (FIG. 6). The whole data set (including the Train/Dev/Test split and the false response candidates) is publicly available, such as at the following url: https://github.com/hiroki13/response-ranking/tree/master/data/input. The data set is built from the Ubuntu IRC chat room where a number of users discuss Ubuntu-related technical issues. The log is organized as one file per day corresponding to a document $\mathcal{D}$. Each document consists of (Time, SenderID, Utterance) lines. If users explicitly mention addressees at the beginning of the utterance, the addresseeID is extracted. Then a sample, namely a unit of input (the dialog context and the current sender) and output (the addressee and response prediction) for the task, is created to predict the ground-truth addressee and response of this line. Note that samples are created only when the addressee is explicitly mentioned for clear, unambiguous ground-truth labels. False response candidates are randomly chosen from all other utterances within the same document. Therefore, distractors are likely from the same sub-conversation or even from the same sender but at different time steps. This makes it harder than Ubuntu as discussed in Lowe (2015) where distractors are randomly chosen from all documents. If no addressee is explicitly mentioned, the addressee is left blank and the line is marked as a part of the context.

Baselines. Apart from Dynamic-RNN, we also include several other baselines. Recent+TF-IDF always selects the most recent speaker (except the responding speaker $a_{res}$) as the addressee and chooses the response to maximize the tf-idf cosine similarity with the context. We improve it by using a slightly different addressee selection heuristic (Direct-Recent+TF-IDF): select the most recent speaker that directly talks to $a_{res}$ by an explicit addressee mention. We select from the previous 15 utterances, which is the longest context among all the experiments. This works much better when there are multiple concurrent sub-conversations, and $a_{res}$ responds to a distant message in the context. We also include another GRU-based model Static-RNN, such as discussed in the following printed publication reference: Ouchi and Tsuboi (2016), the teachings thereof being hereby incorporated herein by reference in their entirety, also referred to as Ouchi-Tsuboi:2016:EMNLP2016. Unlike Dynamic-RNN, speaker embeddings in Static-RNN are based on the order of speakers and are fixed. Furthermore, we implement STATIC-HIER-RNN, a hierarchical version of STATIC-RNN, in view of the discussions by Zhou et al. (2016) and Serban et al. (2016). It first builds utterance embeddings from words and then uses high-level RNNs to process utterance embeddings.

6 Results and Discussion

For fair and meaningful quantitative comparisons, we follow evaluation protocols, such as discussed by Ouchi and Tsuboi (2016). SI-RNN improves the overall accuracy on the addressee and response selection task. Two ablation experiments further analyze the contribution of role-sensitive units and joint selection respectively. We then confirm the robustness of SI-RNN with the number of speakers and distant responses. Finally, in a case study we discuss how SI-RNN handles complex conversations by either engaging in a new sub-conversation or responding to a distant message.

Overall Result. As shown in Table 2 (FIG. 5), our discovery and development of SI-RNN significantly improves upon the previous state-of-the-art. In particular, addressee selection (ADR) benefits most, with different number of candidate responses (denoted as RES-CAND): around 12% in RES-CAND=2 and more than 10% in RES-CAND=10. Response selection (RES) is also improved, suggesting role-sensitive GRUs and joint selection are helpful for response selection as well. The improvement is more obvious with more candidate responses (2% in RES-CAND=2 and 4% in RES-CAND=10). These together result in significantly better accuracy on the ADR-RES metric as well.

Ablation Study. We show an ablation study in the last rows of Table 2 (FIG. 5). First, we share the parameters of $IGRU^S/IGRU^A/GRU^O$. The accuracy decreases significantly, indicating that it is crucial to learn role-sensitive units to update speaker embeddings. Second, to examine our joint selection, we fall back to selecting the addressee and response separately, as in Dynamic-RNN. We find that joint selection improves ADR and RES individually, and it is particularly helpful for pair selection ADR-RES.

Figure 7A:
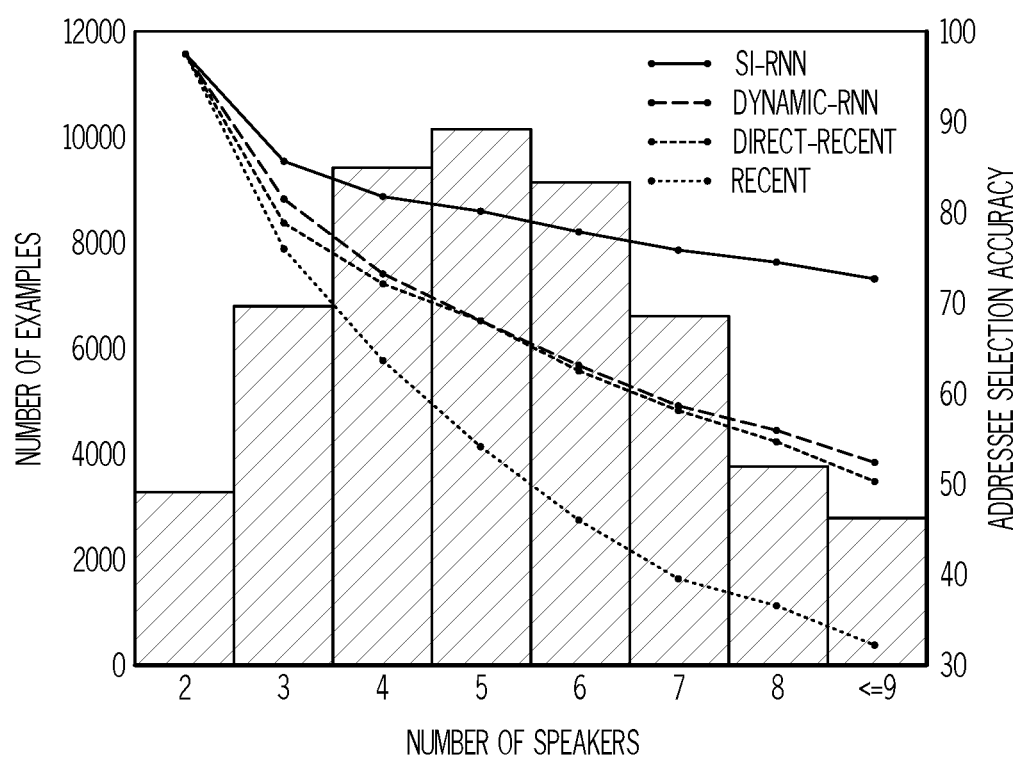
FIG. 7A is a histogram chart illustrating an effect to addressee selection accuracy based on the number of speakers in a context.

Number of Speakers. Numerous speakers create complex dialogs and increased candidate addressee, thus the task becomes more challenging. In FIG. 7A, we investigate how ADR accuracy changes with the number of speakers in the context of length 15, corresponding to the rows with T=15 in Table 2 (FIG. 5). RECENT+TF-IDF always chooses the most recent speaker and the accuracy drops dramatically as the number of speakers increases. DIRECT-RECENT+TF-IDF shows better performance, and DYNAMIC-RNN is marginally better. SI-RNN is much more robust and remains above 70% accuracy across all bins. The advantage is more obvious for bins with more speakers.

Figure 7B:
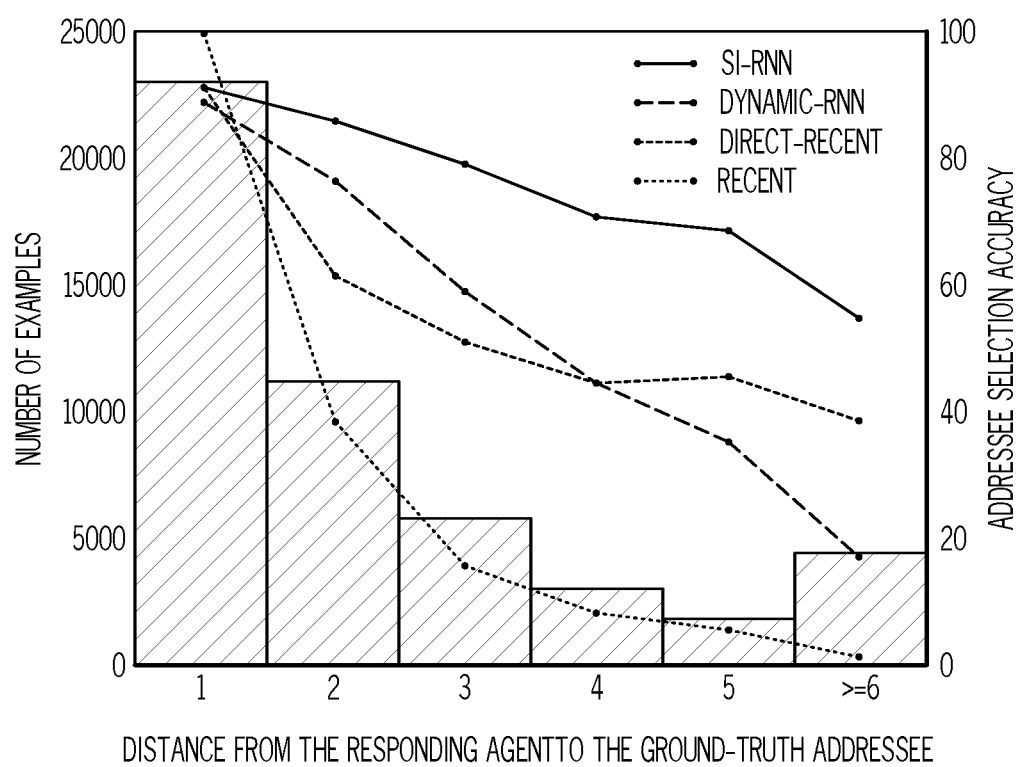
FIG. 7B is a histogram chart illustrating an effect to addressee selection accuracy based on addressee distance from the responding speaker to the ground-truth addressee in a context.

Addressing Distance. Addressing distance is the time difference from the responding speaker to the ground-truth addressee. As the histogram in FIG. 7B shows, while the majority of responses target the most recent speaker, many responses go back five or more time steps. It is important to note that for those distant responses, DYNAMIC-RNN sees a clear performance decrease, even worse than DIRECT-RECENT+TF-IDF. In contrast, SI-RNN handles distant responses much more accurately.

Case Study. Examples in Table 4 (FIGS. 8 and 9) show how SI-RNN can handle complex multi-party conversations by selecting from 10 candidate responses. In both examples, the responding speakers participate in two or more concurrent sub-conversations with other speakers.

Example (a) depicted in FIG. 8 demonstrates the ability of SI-RNN to engage in a new sub-conversation. The responding speaker "wafflejock" is originally involved in two sub-conversations: the sub-conversation 1 with "codepython", and the ubuntu installation issue with "theoletom". While it is reasonable to address "codepython" and "theoletom", the responses from other baselines are not helpful to solve corresponding issues.

TF-IDF prefers the response with the "install" key-word, yet the response is repetitive and not helpful. DYNAMIC-RNN selects an irrelevant response to "codepython". SI-RNN chooses to engage in a new sub-conversation by suggesting a solution to "releaf" about Ubuntu dedicated laptops.

Example (b) depicted in FIG. 9 shows the advantage of SI-RNN in responding to a distant message. The responding speaker "nico-machus" is actively engaged with "VeryBewitching" in the sub-conversation 1 and is also loosely involved in the sub-conversation 2: "chingao" mentions "nicomachus" in the most recent utterance. SI-RNN remembers the distant sub-conversation 1 and responds to "VeryBewitching" with a detailed answer. DIRECT-RECENT+ TF-IDF selects the ground-truth addressee because "VeryBewitching" talks to "nicomachus", but the response is not helpful. DYNAMIC-RNN is biased to the recent speaker "chingao", yet the response is not relevant.

7 Conclusion

SI-RNN jointly models "who says what to whom" by updating speaker embeddings in a role-sensitive way. It provides state-of-the-art addressee and response selection, which can instantly help retrieval-based dialog systems. In various embodiments, the inventors also consider using SI-RNN to extract sub-conversations in the unlabeled conversation corpus and provide a large-scale disentangled multi-party conversation data set.

Figure 10:
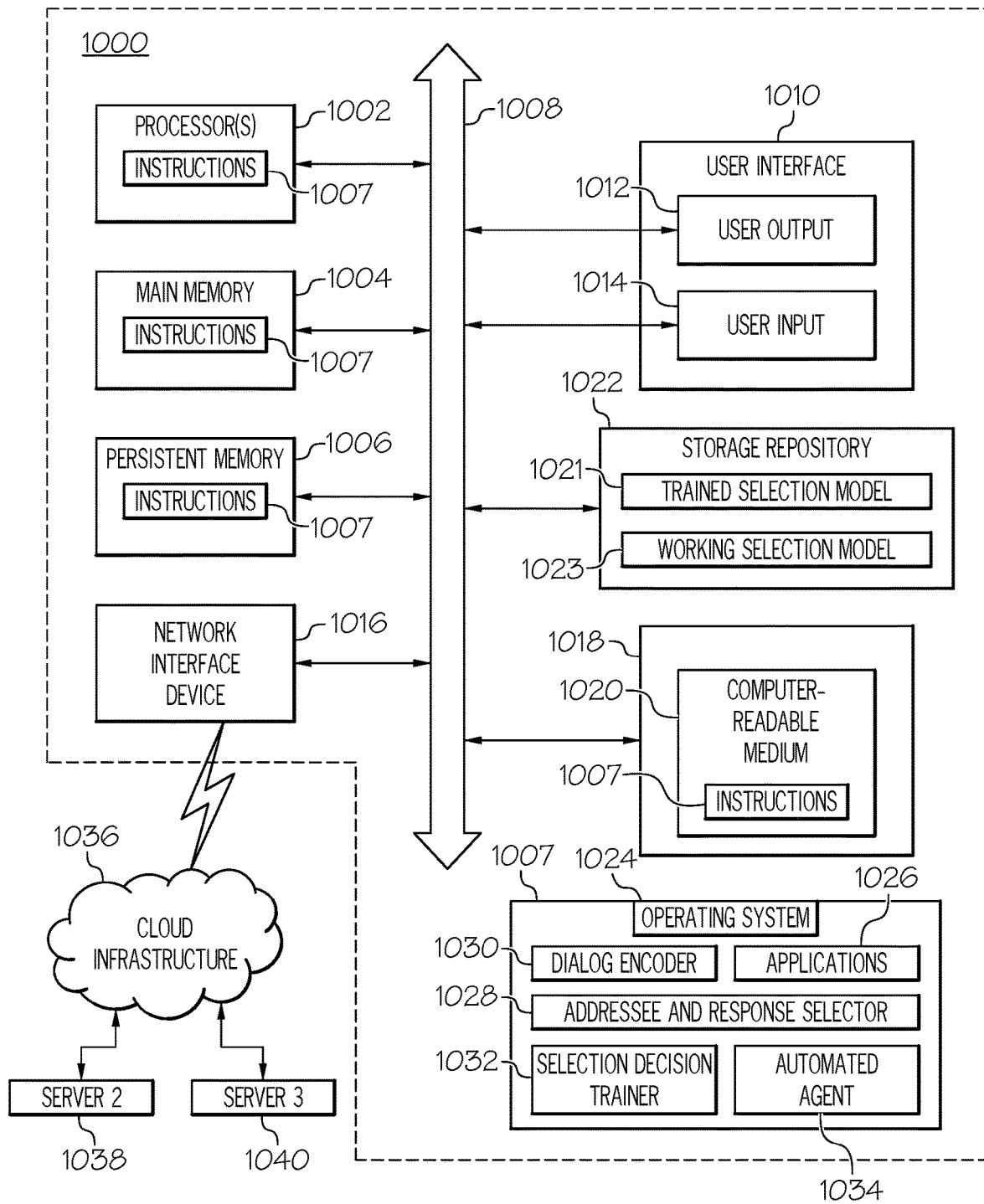
FIG. 10 is a block diagram illustrating an example information processing system, according to an embodiment of the present invention.

Example of an Information Processing System Server Node Operating in a Network and Suitable for Use with Various Embodiments of the Invention FIG. 10 illustrates an example of an information processing system server node 1000 (also referred to as a computer system/server or referred to as a server node) suitable for use according to various embodiments of the present invention. The server node 1000, according to the example, is communicatively coupled with a cloud infrastructure 1036 that can include one or more communication networks. The cloud infrastructure 1036 is communicatively coupled with a storage cloud 1038 (which can include one or more storage servers) and with a computation cloud 1040 (which can include one or more computation servers). This simplified example is not intended to suggest any limitation as to the scope of use or function of various example embodiments of the invention described herein.

The server node 1000 comprises a computer system/server, which is operational with numerous other general purpose or special purpose computing system environments or configurations. Examples of well-known computing systems, environments, and/or configurations that may be suitable for use with such a computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems and/or devices, and the like.

The computer system/server 1000 may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Referring more particularly to FIG. 10, the following discussion will describe a more detailed view of an example cloud infrastructure server node suitable for use according to various embodiments of the invention. According to the example, at least one processor 1002 is communicatively coupled with system main memory 1004 and persistent memory 1006.

A bus architecture 1008 facilitates communicatively coupling between the at least one processor 1002 and the various component elements of the server node 1000. The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system main memory 1004, in one embodiment, can include computer system readable media in the form of volatile memory, such as random access memory (RAM) and/or cache memory. By way of example only, a persistent memory storage system 1006 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, persistent memory 1006 may include at least one program product having a set (e.g., at least one) of program modules that are configured to carry out the functions of various embodiments of the invention.

Program/utility, having a set (at least one) of program modules, may be stored in persistent memory 1006 by way of example, and not limitation, as well as an operating system 1024, one or more application programs 1026, other program modules, and program data. Each of the operating system 1024, one or more application programs 1026, other program modules, and program data, or some combination thereof, may include an implementation of a networking environment. Program modules generally may carry out the functions and/or methodologies of various embodiments of the invention as described herein.

The at least one processor 1002 is communicatively coupled with one or more network interface devices 1016 via the bus architecture 1008. The network interface device 1016 is communicatively coupled, according to various embodiments, with one or more networks operably coupled with a cloud infrastructure 1036. The cloud infrastructure 1036, according to the example, includes a second server 1038, which may also be referred to as a second server node on the network, and a third server 1040, which may also be referred to as a third server node on the network. The network interface device 1016 can communicate with one or more networks such as a local area network (LAN), a general wide area network (WAN), and/or a public network (e.g., the Internet). The network interface device 1016 facilitates communication between the server node 1000 and other server nodes in the cloud infrastructure 1036.

A user interface 1010 is communicatively coupled with the at least one processor 1002, such as via the bus architecture 1008. The user interface 1010, according to the present example, includes a user output interface 1012 and a user input interface 1014. Examples of elements of the user output interface 1012 can include a display, a speaker, one or more indicator lights, one or more transducers that generate audible indicators, and a haptic signal generator. Examples of elements of the user input interface 1014 can include a keyboard, a keypad, a mouse, a track pad, a touch pad, and a microphone that receives audio signals. The received audio signals, for example, can be converted to electronic digital representation and stored in memory, and optionally can be used with voice recognition software executed by the processor 1002 to receive user input data and commands.

A computer readable medium reader/writer device 1018 is communicatively coupled with the at least one processor 1002. The reader/writer device 1018 is communicatively coupled with a computer readable medium 1020. The server node 1000, according to various embodiments, can typically include a variety of computer readable media 1020. Such media may be any available media that is accessible by the processing system/server 1000, and it can include any one or more of volatile media, non-volatile media, removable media, and non-removable media.

Computer instructions 1007 can be at least partially stored in various locations in the server node 1000. For example, at least some of the instructions 1007 may be stored in any one or more of the following: in an internal cache memory in the one or more processors 1002, in the main memory 1004, in the persistent memory 1006, and in the computer readable medium 1020.

The instructions 1007, according to the example, can include computer instructions, data, configuration parameters, and other information that can be used by the at least one processor 1002 to perform features and functions of the server node 1000. According to the present example, the instructions 1007 include an operating system 1024 and one or more applications 1026.

The instructions 1007 also include an Addressee and Response Selector 1028 and a Dialog Encoder 1030, which can update and use objects stored in the memory storage repository 1022 according to the methods that have been discussed above with reference to FIGS. 1-9. One such object stored in the memory storage repository 1022 includes a Trained Selection Model 1021. Another object in the memory storage repository 1022 includes a Working Selection Model 1023.

Selection Decision Trainer

The Trained Selection Model 1021 comprises a database for storing a collection of data and configuration parameters representing at least one model of a multi-party conversation. The at least one model is generated by a Selection Decision Trainer 1032 following the methods described above with respect to FIGS. 1-9. The Selection Decision Trainer 1032 can interoperate with the Dialog Encoder 1030 and with the Addressee and Response Selector 1028 to capture data and train the at least one Trained Selection Model 1021 from a data log of utterances and related data representing aspects of a multi-party conversation between participants using a multi-party conversational channel, as has been discussed above.

For example, a model stored in the Trained Selection Model 1021 can include an encoded representation of each utterance based on its lexical content as well as it can include a continuous vector representation (embedding) of each of the participants in a conversation thread. Each of the participants' embedding can be updated from time step to time step and from turn to turn in the conversation thread. The embedding of each of the participants can be updated according to the participant's role (e.g., sender, addressee, observer), which may change from turn to turn in a conversation thread.

This updating of participant embeddings from time step to time step and over many turns in a conversation thread allows the generated model of the multi-party conversation to more accurately capture the multi-party dialog dynamics which may include a large number of participants. Past approaches to try to capture a model of a multi-party conversation have been considerably inferior in terms of 1) accuracy, 2) the handling of multiple turns in past response dependencies, and 3) the number of participants that can be handled in a multi-party conversation, as compared to that of the present disclosure provided herein.

According to various embodiments, the conversational channel can comprise, for example, and not for limitation, one or more channels selected from the following types of channel: a Ubuntu Internet Relay Chat channel or a Twitter channel, and where data logs from the selected one or more channels can be directly used to learn dialog interactions between participants in multi-party conversations. For example, data logs from the UBUNTU Internet Relay Chat channel or the Twitter channel can be used to learn information technology (IT) support and customer care dialog interactions between participants in multi-party conversations. The UBUNTU Internet Relay Chat channel can provide training dialogs represented in data logs for a large number of IT support topics. Twitter feeds can provide training dialogs on a large amount of customer care topics. Other types of conversational channels that maintain data logs of multi-party conversations are anticipated by the present disclosure. For example, and not for limitation, social networking channels and enterprise networking channels can be suitable for use with various embodiments of the invention.

According to an example operational sequence, the Selection Decision Trainer 1032 models a multi-party dialog. The Selection Decision Trainer 1032 also disentangles a multi-party dialog. These two operational sequences of the Selection Decision Trainer 1032, according to the example, will be summarized below.

Modeling of Multi-party Dialog

During Training:

Each utterance is converted to a continuous vector representation using GRU's.

This embedding is used to update models of the participants in a multi-party conversation according to each participant's role for this utterance. A novel deep learning architecture (SI-RNN) is used to update the models of the participants.

Train the Trained Selection Model 1021 to choose the correct addressee and the correct response using a joint selection criterion.

During Testing:

Pass a partial multi-party dialog (e.g., analyze a stream of utterances in a multi-party conversation at each time step in a series of time steps) through the Selection Decision Trainer 1032 in the processing system 1000.

Choose among a finite list of utterances (e.g., 5 or 10) the correct next utterance and the addressee of this utterance in the multi-party dialog.

Disentanglement of Multi-party Dialog

During Training:

Each utterance is converted to a continuous vector representation using GRU's.

This embedding is used to update the model of a dialog on a specific topic (SI-RNN).

The Selection Decision Trainer 1032 trains the Trained Selection Model 1021 to select whether an utterance belongs to a dialog or not.

During Testing:

Pass a partial multi-party dialog (e.g., analyze a stream of utterances in a multi-party conversation at each time step in a series of time steps) through the Selection Decision Trainer 1032 in the processing system 1000.

An utterance comes to pass through the Selection Decision Trainer 1032, it is converted to a continuous vector representation, and the Selection Decision Trainer 1032 decides (classifies) this utterance regarding whether this utterance belongs to a dialog or not.

Automated Agent

After the at least one Trained Selection Model 1021 is generated by the Selection Decision Trainer 1032 from analyzing the data logs, one of the at least one Trained Selection Model 1021 can be selected as representative of a multi-party conversation in a particular type of conversational channel. The selected model can be stored in a Working Selection Model 1023 in the Storage Repository 1022. The Working Selection Model 1023 comprises a database for storing a collection of data and configuration parameters representing the selected model of a multi-party conversation. The Working Selection Model 1023 can be used, and updated real-time during use, by an Automated Agent 1034 to operate features and functions of an Automated Agent 1034 that can be a participant in a multi-party conversation in a multi-party conversational channel, as has been discussed above. The Automated Agent 1034, for example, can automatically, and without human intervention, insert itself into a multi-party conversation in a conversational channel and accordingly answer technical support and customer care questions in response to utterances sent by other participants in the multi-party conversation. The Automated Agent 1034, according to the example, automatically provides responses (e.g., answers to questions sent by the other participants) that are accurate and in context with the dynamically developing multi-party conversation.

The Automated Agent 1034 can interoperate with the Dialog Encoder 1030 and with the Addressee and Response Selector 1028 to capture data in real time from data logs of utterances and related data representing aspects of a multi-party conversation between participants using a multi-party conversational channel, as has been discussed above. The Automated Agent 1034 thereby can analyze the captured data, based on the selected model stored in the Working Selection Model 1023, and automatically provide responses (e.g., answers to questions sent by the other participants) that are accurate and in context with the dynamically developing multi-party conversation.

The Dialog Encoder 1030 updates participant embeddings in a role-sensitive way. The participant embeddings, according to the example, are updated depending on each participant's role (sender, addressee, observer) in the multi-party conversation thread. Each participant's role, as has been discussed above, may change from turn to turn in a conversation thread.

The Addressee and Response Selector 1028 analyzes the participant embeddings and the data captured from the data logs to provide an accurate response to an utterance sent from a participant. The participant is selected to be the addressee for the response (e.g., the response utterance from the Automated Agent 1034) based on the addressee and response being mutually dependent and the addressee and response selection task being a joint prediction problem, as has been discussed above. The Working Selection Model 1023 can be used, and updated real-time during use, with the conditional probability (of addressee given the response and vice versa) and accordingly the Addressee and Response Selector 1028 selects the addressee and response pair by maximizing the joint probability.

Example Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
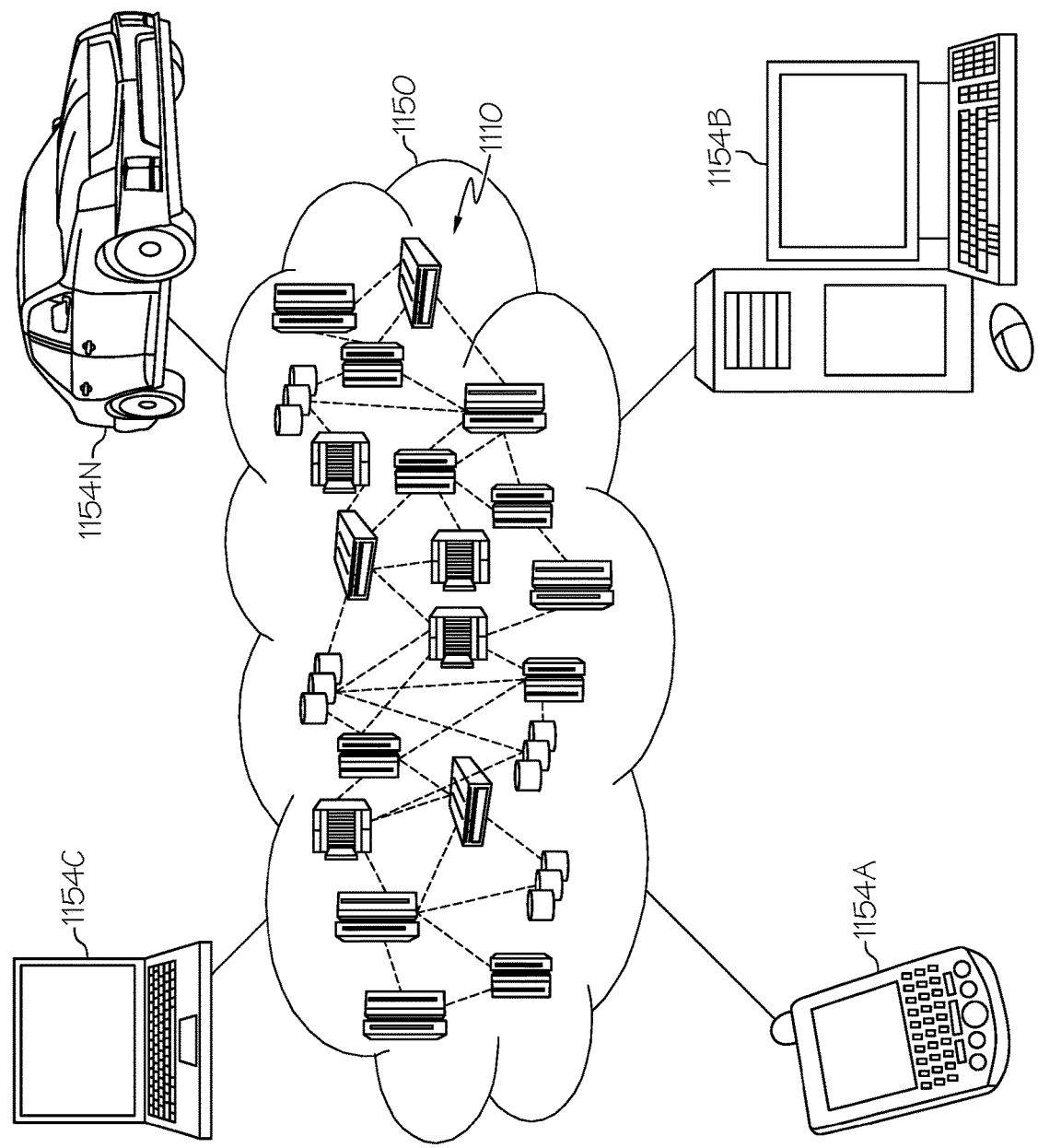
FIG. 11 depicts a cloud computing environment suitable for use in an embodiment of the present invention.

Referring now to FIG. 11, an illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
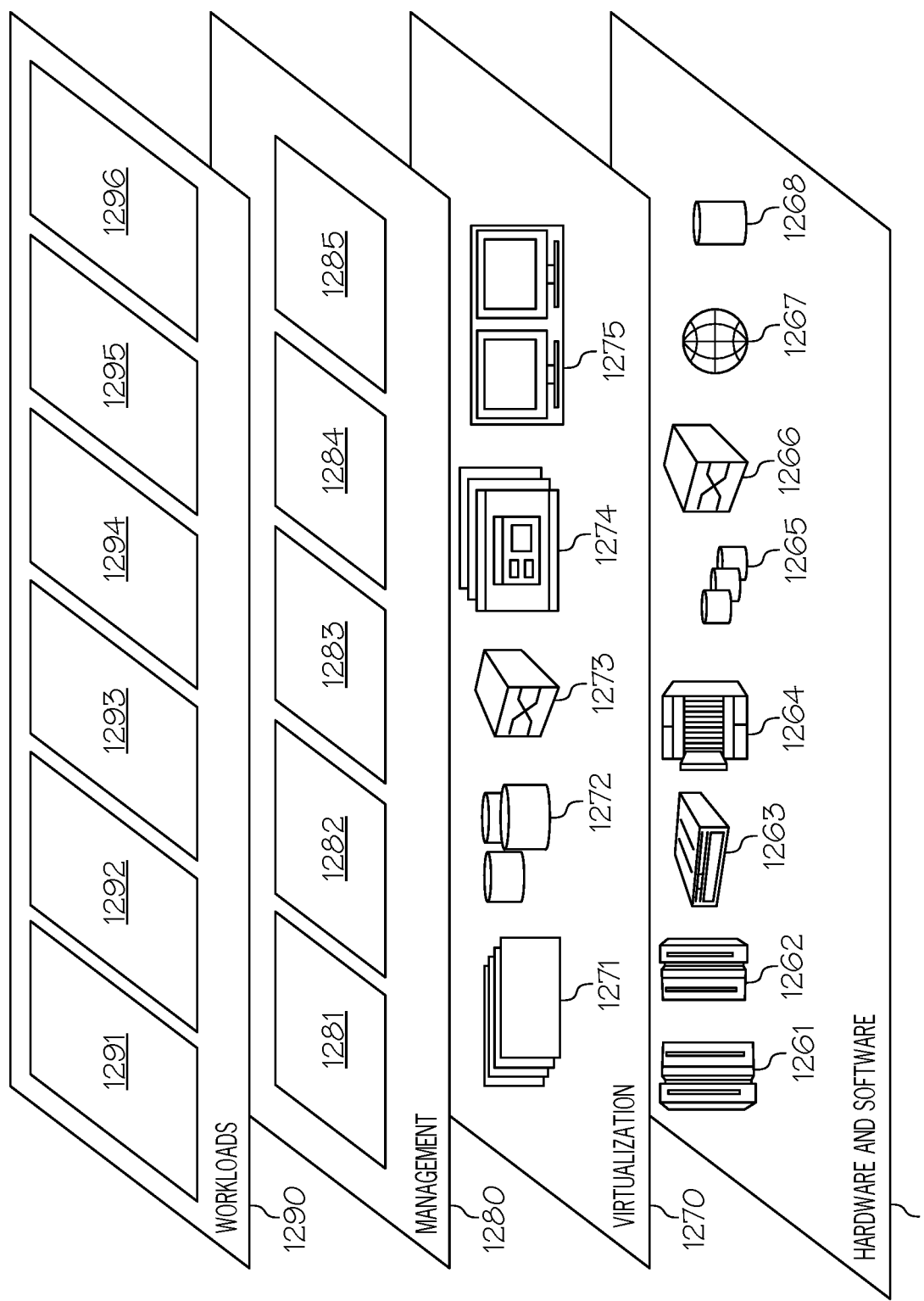
FIG. 12 depicts abstraction model layers according to the cloud computing embodiment of FIG. 11.

Referring now to FIG. 12, a set of functional abstraction layers provided by cloud computing environment 1150 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking of resources which are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and other data communication and delivery services 1296. Various functions and features of the present invention, as have been discussed above, may be provided with use of a server node 1000 communicatively coupled with a cloud infrastructure 1032.

Non-Limiting Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present invention can further incorporate interfaces that each includes separate, fully programmed microprocessors that are used to off-load processing from the processor. An operating system included in main memory for a processing system may be a suitable multitasking and/or multiprocessing operating system, such as, but not limited to, any of the Linux, UNIX, Windows, and Windows Server based operating systems. Various embodiments of the present invention are able to use any other suitable operating system. Various embodiments of the present invention utilize architectures, such as an object oriented framework mechanism, that allow instructions of the components of the operating system to be executed on any processor located within an information processing system. Various embodiments of the present invention are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "include", "includes", "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The terms "dialog" and "conversation", as used herein, are normally synonymous unless the context clearly indicates otherwise. The terms "dialog thread" or "conversation thread", as used herein, describe examples of a collection of utterances that are logically linked together, typically linked in a time sequence, in a multi-party conversation associated with a topic of conversation. A "dialog turn" or a "conversation turn", as used herein, are normally synonymous unless the context clearly indicates otherwise, and both describe examples of a collection of one or more utterances in which the roles associated with individual users (also referred to as participants), typically persons, in a multi-party conversation correspond to a set of unvarying roles selected from: sender, addressee, or observer. One or more of those roles normally vary across each turn in a multi-party conversation. A sender, which may also be referred to as a speaker, as used herein unless the context clearly indicates otherwise, means a participant in a multi-party conversation who sends (e.g., speaks) an utterance into a multi-party conversation, and which such utterance is typically destined for reception by at least one of the other participants in the multi-party conversation. An addressee, as used herein unless the context clearly indicates otherwise, means a participant in a multi-party conversation who is an intended recipient of an utterance sent by a sender into the multi-party conversation. An observer, as used herein unless the context clearly indicates otherwise, means a participant in a multi-party conversation who is neither a sender nor an addressee of an utterance sent by a sender into the multi-party conversation.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular use contemplated.

LIST OF REFERENCES CITED IN THE ABOVE DISCLOSURE

Bordes, A., and Weston, J. 2017. Learning end-to-end goal-oriented dialog. In *ICLR*.

Chen, P.-C.; Chi, T.-C.; Su, S.-Y.; and Chen, Y.-N. 2017. Dynamic time-aware attention to speaker roles and contexts for spoken language understanding. In *ASRU*.

Chi, T.-C.; Chen, P.-C.; Su, S.-Y.; and Chen, Y.-N. 2017. Speaker role contextual modeling for language understanding and dialogue policy learning. In *IJCNLP*.

Cho, K.; van Merrienboer, B.; Gulcehre, C.; Bandanau, D.; Bougares, F.; Schwenk, H.; and Bengio, Y. 2014. Learning phrase representations using rnn encoder-decoder for statistical machine translation. In *EMNLP*.

Chung, J.; Gulcehre, C.; Cho, K.; and Bengio, Y. 2014. Empirical evaluation of gated recurrent neural networks on sequence modeling. *NIPS 2014 Deep Learning and Representation Learning Workshop*.

Henderson, J.; Lemon, O.; and Georgila, K. 2008. Hybrid reinforcement/supervised learning of dialogue policies from fixed data sets. *Computational Linguistics* 34(4):487-511.

Henderson, M.; Thomson, B.; and Williams, J. 2014. The second dialog state tracking challenge. In *SIGDIAL*. Henderson, M.; Thomson, B.; and Young, S. 2014. Word-based dialog state tracking with recurrent neural networks. In *SIGDIAL*.

Hu, B.; Lu, Z.; Li, H.; and Chen, Q. 2014. Convolutional neural network architectures for matching natural language sentences. In *NIPS*.

Ji, Z.; Lu, Z.; and Li, H. 2014. An information retrieval approach to short text conversation. *arXiv preprint arXiv:1408.6988*.

Jovanovic, N.; Akker, R. o. d.; and Nijholt, A. 2006. Addressee identification in face-to-face meetings. In *EACL*.

Li, J.; Galley, M.; Brockett, C.; Spithourakis, G.; Gao, J.; and Dolan, B. 2016. A persona-based neural conversation model. In ACL.

Lowe, R.; Pow, N.; Serban, I.; and Pineau, J. 2015. The Ubuntu Dialogue Corpus: A large dataset for research in unstructured multi-turn dialogue systems. In *SIGDIAL*.

Lu, Z., and Li, H. 2013. A deep architecture for matching short texts. In *NIPS*.

Mei, H.; Bansal, M.; and Walter, M. R. 2017. Coherent dialogue with attention-based language models. In *AAAI*.

Meng, Z.; Mou, L.; and Jin, Z. 2017. Towards neural speaker modeling in multi-party conversation: The task, dataset, and models. *arXiv preprint arXiv:1708.03152*.

Mesnil, G.; Dauphin, Y.; Yao, K.; Bengio, Y.; Deng, L.; Hakkani-Tur, D.; He, X.; Heck, L.; Tur, G.; Yu, D.; et al. 2015. Using recurrent neural networks for slot filling in spoken language understanding. *Audio, Speech, and Language Processing, IEEE/ACM Transactions on* 23(3):530-539.

op den Akker, R., and Traum, D. 2009. A comparison of addressee detection methods for multiparty conversations. *Workshop on the Semantics and Pragmatics of Dialogue*.

Ouchi, H., and Tsuboi, Y. 2016. Addressee and response selection for multi-party conversation. In *EMNLP*.

Ritter, A.; Cherry, C.; and Dolan, W. B. 2011. Data-driven response generation in social media. In *EMNLP*.

Serban, I. V.; Sordoni, A.; Bengio, Y.; Courville, A.; and Pineau, J. 2016. Building end-to-end dialogue systems using generative hierarchical neural network models. In *AAAI*.

Shang, L.; Lu, Z.; and Li, H. 2015. Neural responding machine for short-text conversation. In ACL.

Singh, S. P.; Kearns, M. J.; Litman, D. J.; and Walker, M. A. 1999. Reinforcement learning for spoken dialogue systems. In *NIPS*.

Vinyals, O., and Le, Q. 2015. A neural conversational model. *ICML Deep Learning Workshop*.

Wang, M.; Lu, Z.; Li, H.; and Liu, Q. 2015. Syntax-based deep matching of short texts. In *IJCAI*.

Wen, T.-H.; Gasic, M.; Mrksic, N.; Su, P.-H.; Vandyke, D.; and Young, S. 2015. Semantically conditioned lstm-based natural language generation for spoken dialogue systems. In *EMNLP*.

Wen, T.-H.; Vandyke, D.; Mrksic, N.; Gasic, M.; Rojas-Barahona, L. M.; Su, P.-H.; Ultes, S.; and Young, S. 2016. A network-based end-to-end trainable task-oriented dialogue system. *arXiv preprint arXiv:1604.04562*.

Williams, J.; Raux, A.; and Henderson, M. 2016. The dialog state tracking challenge series: A review. *Dialogue & Discourse* 7(3):4-33.

Yao, K.; Peng, B.; Zhang, Y.; Yu, D.; Zweig, G.; and Shi, Y. 2014. Spoken language understanding using long short-term memory neural networks. In *Spoken Language Technology Workshop (SLT), 2014 IEEE*, 189-194. IEEE.

Young, S.; Gasic, M.; Thomson, B.; and Williams, J. D. 2013. Pomdp-based statistical spoken dialog systems: A review. *Proceedings of the IEEE* 101(5):1160-1179.

Zhou, X.; Dong, D.; Wu, H.; Zhao, S.; Yu, D.; Tian, H.; Liu, X.; and Yan, R. 2016. Multi-view response selection for human-computer conversation. In *EMNLP*.

The collective teachings of the above listed printed publication references are hereby incorporated by reference herein in their entirety.

What is claimed is:

1. A computer implemented method for modeling multi-party dialog interactions using deep learning to build automated agents for social and enterprise networking channels, the method comprising:

learning, directly from data obtained from a multi-party conversational channel, to identify particular multi-party dialog threads as well as speakers in one or more conversations, by:

during training, from a multi-party dialog, converting each participant utterance to a continuous vector representation and updating a model of the multi-party dialog relative to each participant utterance in the multi-party dialog according to each participant's utterance role selected from a set of: sender, addressee, or observer;

training the model to choose a correct addressee and a correct response for each participant utterance, using a joint selection criterion;

during testing, parsing data obtained from the multi-party conversational channel to identify and classify individual participant utterances regarding whether each participant utterance belongs in a particular multi-party dialog thread, by choosing for each identified participant utterance a finite list of correct next identified participant utterance and an addressee of the correct next identified participant utterance in the particular multi-party dialog thread; and learning, directly from the data obtained from the multi-party conversational channel, which dialog turns belong to each particular multi-party dialog thread, by:

during training, from the continuous vector representation, updating the model of the multi-party dialog on a specific dialog topic and training the model to select whether each participant utterance belongs in the dialog topic or not; and during testing, parsing data obtained from the multi-party conversational channel to classify each participant utterance by converting the participant utterance to a continuous vector representation regarding whether each participant utterance belongs to a dialog topic or not;

storing the model in a working selection model database in a storage memory repository; and an automated agent, using and updating the model stored in the working selection model database, by:

monitoring utterances from participants in a multi-party conversation in a multi-party conversational channel;

automatically inserting the automated agent into the multi-party conversation as a participant in the multi-party conversation; and sending, with the automated agent, one or more automated agent utterances into the multi-party conversation in response to utterances sent by other participants in the multi-party conversation, the automated agent response utterances providing answers to technical support and customer care questions that the automated agent determined were in the monitored utterances from the other participants in the multi-party conversation, the automated agent response utterances being selected, and an addressee of each automated agent response utterance being selected, by the automated agent to provide accurate answers to the questions based on a conditional probability of the selected addressee being the correct addressee given the selected response utterance and vice versa, thereby selecting the addressee and response utterance pair by maximizing a joint probability.

2. The method of claim 1, wherein the multi-party conversational channel comprises any one or more channels selected from the following: UBUNTU Internet Relay Chat channel and Twitter channel, and wherein the selected one or more channels are directly used to learn information technology (IT) support and customer care dialog interactions.

3. The method of claim 1, wherein the method is performed with a selection decision trainer, comprising software executed with at least one processor, in an information processing system, and the model is stored in a trained selection model database in storage memory repository in the information processing system.

4. The method of claim 3, wherein the method is performed with the selection decision trainer operatively coupled with a dialog encoder and with an addressee and response selector, each of the dialog encoder and the addressee and response selector comprising software executed with the at least one processor, in the information processing system.

5. The method of claim 1, further including, based on the monitoring utterances from participants in the multi-party conversation, updating in the stored model participant embeddings of the participants in the multi-party conversation, the updating in the stored model the participant embeddings being based on each participant's role in a multi-party conversation thread in a mutli-party conversation, each participant's role being selected from the following set of roles: sender, addressee, or observer.

6. The method of claim 5, wherein the updating in the stored model the participant embeddings of the participants in the multi-party conversation being based on each participant's role in the multi-party conversation thread monitored across multiple turns in the multi-party conversation thread.

7. A computer program product for an information processing system comprised of a server, the computer program product comprising a computer readable storage medium having computer readable program code embodied therewith, the computer readable program code including computer instructions, where a processor, responsive to executing the computer instructions, performs operations comprising:

learning, directly from data obtained from a multi-party conversational channel, to identify particular multi-party dialog threads as well as speakers in one or more conversations, by:

during training, from a multi-party dialog, converting each participant utterance to a continuous vector representation and updating a model of the multi-party dialog relative to each participant utterance in the multi-party dialog according to each participant's utterance role selected from a set of: sender, addressee, or observer;

training the model to choose a correct addressee and a correct response for each participant utterance, using a joint selection criterion;

during testing, parsing data obtained from the multi-party conversational channel to identify and classify individual participant utterances regarding whether each participant utterance belongs in a particular multi-party dialog thread, by choosing for each identified participant utterance a finite list of correct next identified participant utterance and an addressee of the correct next identified participant utterance in the particular multi-party dialog thread; and learning, directly from the data obtained from the multi-party conversational channel, which dialog turns belong to each particular multi-party dialog thread, by:
during training, from the continuous vector representation, updating the model of the multi-party dialog on a specific dialog topic and training the model to select whether each participant utterance belongs in the dialog topic or not; and
during testing, parsing data obtained from the multi-party conversational channel to classify each participant utterance by converting the participant utterance to a continuous vector representation regarding whether each participant utterance belongs to a dialog topic or not;
storing the model in a working selection model database in a storage memory repository; and
an automated agent, using and updating the model stored in the working selection model database, by:
monitoring utterances from participants in a multi-party conversation in a multi-party conversational channel;
automatically inserting the automated agent into the multi-party conversation as a participant in the multi-party conversation; and
sending, with the automated agent, one or more automated agent utterances into the multi-party conversation in response to utterances sent by other participants in the multi-party conversation, the automated agent response utterances providing answers to technical support and customer care questions that the automated agent determined were in the monitored utterances from the other participants in the multi-party conversation, the automated agent response utterances being selected, and an addressee of each automated agent response utterance being selected, by the automated agent to provide accurate answers to the questions based on a conditional probability of the selected addressee being the correct addressee given the selected response utterance and vice versa, thereby selecting the addressee and response utterance pair by maximizing a joint probability.

8. The computer program product of claim 7, wherein the multi-party conversational channel comprises any one or more channels selected from the following: UBUNTU Internet Relay Chat channel and Twitter channel, and wherein the selected one or more channels are directly used to learn information technology (IT) support and customer care dialog interactions.

9. The computer program product of claim 7, wherein the operations are performed with a selection decision trainer, comprising software executed with at least one processor, in an information processing system, and the model is stored in a trained selection model database in storage memory repository in the information processing system.

10. The computer program product of claim 9, wherein the operations are performed with the selection decision trainer operatively coupled with a dialog encoder and with an addressee and response selector, each of the dialog encoder and the addressee and response selector comprising software executed with the at least one processor, in the information processing system.

11. The computer program product of claim 7 in which the operations further comprise:
based on the monitoring utterances from participants in the multi-party conversation, updating in the stored model participant embeddings of the participants in the multi-party conversation, the updating of the participant embeddings being based on each participant's role in a multi-party conversation thread in the mutli-party conversation, each participant's role being selected from the following set of roles: sender, addressee, or observer.

12. The computer program product of claim 11, wherein the updating in the stored model of the participant embeddings of the participants being based on each participant's role in the multi-party conversation thread being monitored across multiple turns in the multi-party conversation thread.

13. A processing system comprising:
a server;
memory;
a network interface device for communicating with one or more networks; and
at least one processor, communicatively coupled with the server, the memory, and the network interface device, the at least one processor, responsive to executing computer instructions, for performing operations comprising:
learning, directly from data obtained from a multi-party conversational channel, to identify particular multi-party dialog threads as well as speakers in one or more conversations, by:
during training, from a multi-party dialog, converting each participant utterance to a continuous vector representation and updating a model of the multi-party dialog relative to each participant utterance in the multi-party dialog according to each participant's utterance role selected from a set of: sender, addressee, or observer;
training the model to choose a correct addressee and a correct response for each participant utterance, using a joint selection criterion;
during testing, parsing data obtained from the multi-party conversational channel to identify and classify individual participant utterances regarding whether each participant utterance belongs in a particular multi-party dialog thread, by choosing for each identified participant utterance a finite list of correct next identified participant utterance and an addressee of the correct next identified participant utterance in the particular multi-party dialog thread: and
learning, directly from the data obtained from the multi-party conversational channel, which dialog turns belong to each particular multi-party dialog thread, by:
during training, from the continuous vector representation, updating the model of the multi-party dialog on a specific dialog topic and training the model to select whether each participant utterance belongs in the specific dialog topic or not; and
during testing, parsing data obtained from the multi-party conversational channel to classify each participant utterance by converting the participant utterance to a continuous vector representation regarding whether each participant utterance belongs to a specific dialog topic or not;
storing the model in a working selection model database in a storage memory repository; and
an automated agent, using and updating the model stored in the working selection model database, by:
monitoring utterances from participants in a multi-party conversation in a multi-party conversational channel;

automatically inserting the automated agent into the multi-party conversation as a participant in the multi-party conversation; and sending, with the automated agent, one or more automated agent utterances into the multi-party conversation in response to utterances sent by other participants in the multi-party conversation, the automated agent utterances providing answers to technical support and customer care questions that the automated agent determined were in the monitored utterances from the other participants in the multi-party conversation, the automated agent utterances being selected, and the addressee of each automated agent utterance being selected, by the automated agent to provide accurate answers to the questions based on a conditional probability of the selected addressee being the correct addressee given the selected response and vice versa, thereby selecting the addressee and response pair by maximizing the joint probability.

14. The processing system of claim 13, wherein the multi-party conversational channel comprises any one or more channels selected from the following: UBUNTU Internet Relay Chat channel and Twitter channel, and wherein the selected one or more channels are directly used to learn information technology (IT) support and customer care dialog interactions.

15. The processing system of claim 13, wherein the operations are performed with a selection decision trainer, comprising software executed with at least one processor, in an information processing system, and the model is stored in a trained selection model database in storage memory repository in the information processing system.

16. The processing system of claim 15, wherein the operations are performed with the selection decision trainer operatively coupled with a dialog encoder and with an addressee and response selector, each of the dialog encoder and the addressee and response selector comprising software executed with the at least one processor, in the information processing system.

17. The processing system of claim 13, in which the operations further comprise:

based on the monitoring utterances from participants in the multi-party conversation, updating in the stored model participant embeddings of the participants in the multi-party conversation, the updating of the participant embeddings being based on each participant's role in a multi-party conversation thread in the mutli-party conversation, each participant's role being selected from the following set of roles: sender, addressee, or observer, and wherein each participant's role in the multi-party conversation thread being monitored across multiple turns in the multi-party conversation thread.

* * * * *